(12) United States Patent
Dickie

(10) Patent No.: US 12,301,546 B2
(45) Date of Patent: May 13, 2025

(54) ANONYMOUS AUTHENTICATION SYSTEM AND METHODS FOR OBSCURING AUTHENTICATION INFORMATION IN NETWORKED COMPUTING SYSTEMS

(71) Applicant: Changefly Inc., Seattle, WA (US)

(72) Inventor: Lukas J. Dickie, Seattle, WA (US)

(73) Assignee: Changefly Inc., Seattle, WA (US)

( * ) Notice: Subject to any disclaimer, the term of this patent is extended or adjusted under 35 U.S.C. 154(b) by 221 days.

(21) Appl. No.: 17/936,629

(22) Filed: Sep. 29, 2022

(65) Prior Publication Data

US 2023/0104852 A1    Apr. 6, 2023

Related U.S. Application Data

(60) Provisional application No. 63/251,529, filed on Oct. 1, 2021.

(51) Int. Cl.
*H04L 9/40* (2022.01)
(52) U.S. Cl.
CPC ........ *H04L 63/0421* (2013.01); *H04L 63/062* (2013.01)
(58) Field of Classification Search
CPC .................... H04L 63/0421; H04L 63/062
See application file for complete search history.

(56) References Cited

U.S. PATENT DOCUMENTS

| 8,583,932 | B2 | 11/2013 | Furukawa |
| 2006/0143695 | A1 | 6/2006 | Grynberg |
| 2014/0281525 | A1 | 9/2014 | Acar et al. |

FOREIGN PATENT DOCUMENTS

| CN | 104125199 B | 4/2019 |
| CN | 108769020 B | 7/2021 |

OTHER PUBLICATIONS

International Search Report and Written Opinion, PCT/US2022/077255, Jan. 19, 2023, 6 pages.

*Primary Examiner* — Ryan J Jakovac
(74) *Attorney, Agent, or Firm* — Stanek Lemon Crouse Meeks, PA

(57) ABSTRACT

System and methods for anonymously authenticating a client device and/or user are disclosed. An authentication system can register and/or activate a client device and provide the client device with credentials for accessing or otherwise logging into a third-party application. The client device can provide the third-party application with credentials received from the authentication system and/or self-generated credentials. The third-party application can interact with the authentication system to confirm an identity of the client device and/or authenticate the client device to access the third-party application.

18 Claims, 14 Drawing Sheets

FIG. 10

AA APPLICATION 112'

9:41 ✕

☐ ✎ Personal ⌵
☐ ✎ Work

AA APPLICATION 112'

9:41 ✕

☐ ✎ Personal ⌵
☐ ✎ Work
☐ ✎ Acme Co

142

ANONYMOUS AUTHENTICATION SYSTEM AND METHODS FOR OBSCURING AUTHENTICATION INFORMATION IN NETWORKED COMPUTING SYSTEMS

CROSS-REFERENCES TO RELATED APPLICATIONS

This application claims the benefit of U.S. Provisional Patent Application No. 63/251,529, filed Oct. 1, 2021, entitled "Anonymous Authentication (AA) Systems and Methods for Obscuring Authentication Information in Networked Computing Systems," the disclosure of which is hereby incorporated herein by reference in its entirety for all purposes.

TECHNICAL FIELD

The present inventive concept relates generally to computer systems security and, more particularly, to anonymous authentication systems and methods for obscuring authentication information in networked computing systems.

BACKGROUND

In many web applications, such as online banking, credit, shopping, and auction applications, it can be desirable to have a user log in using unique credentials (e.g., username and password) to authenticate the user before authorizing the user to access certain web pages on the web server. While there are many web-based authentication techniques, many have security weaknesses or vulnerabilities. The vulnerabilities have been exploited via a number of different attacks through which certain bad actors, such as hackers, have tried to obtain the credentials and/or other personal information of the user using known techniques, such as spoofing, phishing and fraudulent web sites, in order to gain access to these websites. Therefore, new approaches for authentication and security of network computing systems are desired.

Individuals often have many usernames and passwords. For example, an individual may have a different username and/or password for each online application. To that end, it is common for an individual to maintain a list of all usernames and passwords, which they have to query each time they access an online application. A list of usernames and passwords is inconvenient to both maintain and access. New approaches for managing credentials are desired.

SUMMARY

System and methods for anonymously authenticating a client device and/or user are disclosed. An authentication system can register and/or activate a client device and provide the client device with credentials for accessing or otherwise logging into a third-party application. The client device can provide the third-party application with credentials received from the authentication system and/or self-generated credentials. The third-party application can interact with the authentication system to confirm an identity of the client device and/or authenticate the client device to access the third-party application.

In some embodiments, the presently disclosed subject matter provides an anonymous authentication system and methods for obscuring authentication information in networked computing systems.

In some embodiments, the anonymous authentication system and methods may be implemented using a client-server architecture in which a server-based anonymous authentication application may be running on an application server and a client-based anonymous authentication application may be running on a networked user computer and wherein the client-based anonymous authentication application is the counterpart to the server-based anonymous authentication application.

In some embodiments, the anonymous authentication system and methods may provide an anonymous authentication application that may include, for example, an anonymous client registration module for performing an anonymous client registration process, an anonymous client activation module for performing an anonymous client activation process, an anonymous user ID and passcode initialization module for performing an anonymous user ID and passcode initialization process, and an anonymous user ID and passcode authentication module for performing an anonymous user ID and passcode authentication process.

In some embodiments, the anonymous authentication system and methods may provide anonymous authentication information, such as, but not limited to, anonymous usernames called, for example, QuickCodes or QuickUsernames; anonymous passwords called, for example, QuickPINs or QuickPasswords; anonymous telephone numbers called, for example, QuickPhones; and anonymous email addresses called, for example QuickEmails.

In some embodiments, the anonymous authentication system and methods may provide QuickCodes or QuickUsernames that may be used in place of traditional usernames, QuickPINs or QuickPasswords that may be used in place of traditional passwords, QuickPhones that may be used in place of traditional telephone numbers, and QuickEmails that may be used in place of traditional email addresses.

In some embodiments, the anonymous authentication system and methods may provide QuickCodes or QuickUsernames (i.e., correlating to usernames), QuickPINs or QuickPasswords (i.e., correlating to passwords), QuickPhones (i.e., correlating to telephone numbers), and QuickEmails (i.e., correlating to email addresses) that may be generated randomly and on-the-fly. As used herein, "on-the-fly" refers to something that is done quickly without a lot of preparation, in other words, automatically in real time.

In some embodiments, the anonymous authentication system and methods may provide an easy and convenient username and password management application that may be used to remove the barrier of users having to remember and/or maintain a list of usernames and passwords.

In some embodiments, the anonymous authentication system and methods may provide a high degree of privacy and security for the user in that the stored authentication data of third-party entities may include, for example, anonymous QuickUsernames, QuickPasswords, QuickPhones, and/or QuickEmails rather than, for example, traditional usernames, passwords, telephone numbers, and email addresses.

In some embodiments, the anonymous authentication system and methods may be used to automatically generate, for example, anonymous QuickCodes, QuickUsernames, QuickPINs, QuickPasswords, QuickPhones, and/or QuickEmails on-the-fly and wherein the "on-the-fly" feature frees a user from manually creating anonymous data and allows the anonymous authentication system to automatically generate and manage anonymous data which can only be used by a single user of the anonymous authentication system. For example, if an anonymous QuickEmail stored in a third-party data (e.g., in data store 132) becomes compromised, the anonymous authentication system can generate a new anonymous QuickEmail for information in the data store 132 and block or prevent the compromised anonymous QuickEmail from future use.

BRIEF DESCRIPTION OF THE DRAWINGS

FIGS. 2-14 show screenshots of an example of a mobile application of the anonymous authentication system in accordance with some embodiments of the present inventive concept.

DETAILED DESCRIPTION

Although certain cases and examples are described below, it will be understood that the disclosure extends beyond the specifically disclosed embodiments and/or uses and obvious modifications and equivalents thereof. Thus, it is intended that the scope of the disclosure herein disclosed should not be limited by any particular embodiments described below.

It will be understood that although the terms QuickCodes, QuickUsernames, QuickPINs, QuickPasswords, QuickPhones, and/or QuickEmails are used herein to refer to various aspects of the present inventive concept, embodiments of the present inventive concept are not limited thereto. Any other terms may be used to refer to the various functions without departing from the scope of the present inventive concept.

Figure 1:
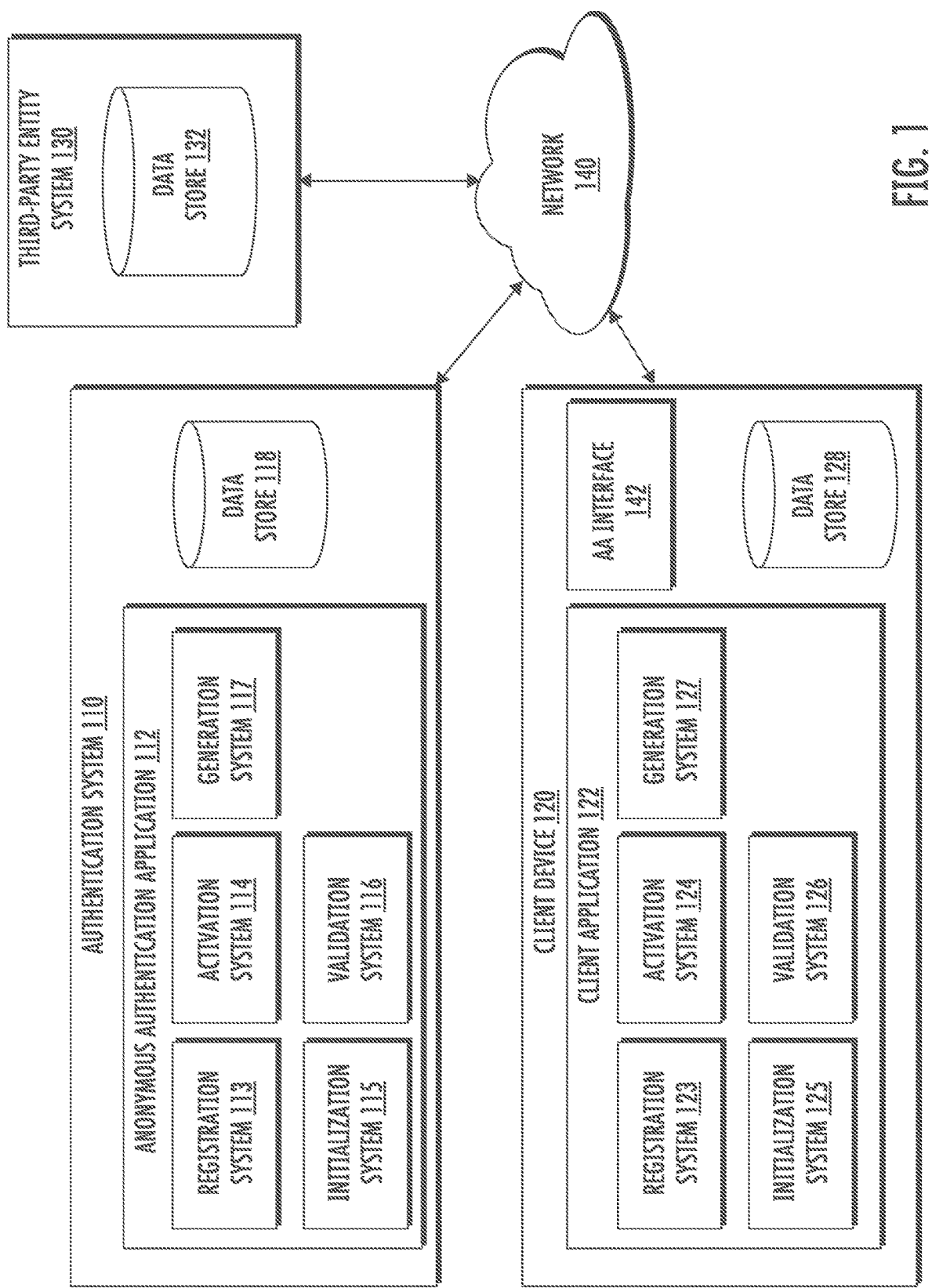
FIG. 1 illustrates a block diagram of an example anonymous authentication system for obscuring authentication information in networked computing systems.

FIG. 1 illustrates an embodiment of an anonymous authentication environment 100 for obscuring authentication information in networked computing systems. The anonymous authentication environment 100 includes an authentication system 110, a client device 120, and a third-party entity system 130, and a network 140. To simplify discussion and not to limit the present disclosure, FIG. 1 illustrates only one authentication system 110, client device 120, and third-party entity system 130, though multiple may be used.

Any of the foregoing components or systems of the anonymous authentication environment 100 may communicate via the network 140. Although only one network 140 is illustrated, multiple distinct and/or distributed networks 140 may exist. The network 140 can include any type of communication network. For example, the network 140 can include one or more of a wide area network (WAN), a local area network (LAN), a cellular network, an ad hoc network, a satellite network, a wired network, a wireless network, and so forth. In some embodiments, the network 140 can include the Internet.

Any of the foregoing components or systems of the anonymous authentication environment 100, such as any combination of the client authentication system 110, the client device 120, or the third-party entity system 130 may be implemented using individual computing devices, processors, distributed processing systems, servers, isolated execution environments (e.g., virtual machines, containers, etc.), shared computing resources, or so on. Furthermore, any of the foregoing components or systems of the anonymous authentication environment 100 may host or execute one or more client applications, which may include a web browser, a mobile application, a background process that performs various operations with or without direct interaction from a user, or a "plug-in" or "extension" to another application, such as a web browser plug-in or extension.

The third-party entity system 130 can represent any computing device capable of interacting with or running a third-party application that uses or requires an authentication process, such as, but are not limited to, banks or any financial institutions, utility companies, healthcare providers, entertainment providers, retailers, online shopping sites, travel websites, and the like. Examples of third-party entity system 130 may include, without limitation, smart phones, tablet computers, handheld computers, wearable devices, laptop computers, desktop computers, servers, portable media players, gaming devices, and so forth. In some cases, the third-party entity system 130 may include any networked or online service providers that may be accessed by client devices 120 and that may require an authentication process. In some cases, the third-party entity system 130 may include a web browser, a mobile application or "app," a background process that performs various operations with or without direct interaction from a user, or a "plug-in" or "extension" to another application, such as a web browser plug-in or extension. In some cases, the third-party entity system 130 may be hosted or executed by one or more host devices (not shown), which may broadly include any number of computers, virtual machine instances, and/or data centers that are configured to host or execute one or more instances of a third-party application that uses or requires an authentication process.

The third-party entity system 130 can include or be in communication with a data store 132. The data store 132 can be made up of one or more data stores storing client information that has been received from, or is associated with, one or more of the client device 120, the third-party entity system 130, or the authentication system 110. The client information can vary across embodiments. For example, the client information can include, but is not limited to, third-party credentials (e.g., usernames, passwords, etc.) for accessing associated third-party applications, other credentials, credit card information, personal information of users (e.g., names, addresses, phone number, email address, secret phrases, etc.), or information relating to client devices 120 (e.g., IP address, point-of-presence, access point identifiers, access point names (APN), network names, service set identifiers (SSIDs), public land mobile network (PLMN) identifiers, session IDs). Although the data store 132 is implemented as being stored on the third-party entity system 130, this should not be construed as limiting. For example, the data store 132 can include or be implemented as cloud storage, such as Amazon Simple Storage Service (S3), Elastic Block Storage (EBS) or CloudWatch, Google Cloud Storage, Microsoft Azure Storage, InfluxDB, etc.

The client device 120 represents any computing device capable of interacting with or running the client application 122 and/or an application associated with a third-part entity system 130, such as an online banking, credit, shopping, or auction application. Examples of client devices 120 may include, without limitation, smart phones, tablet computers, handheld computers, wearable devices, laptop computers, desktop computers, servers, portable media players, gaming devices, and so forth.

The client application 122 may provide an interface through which a user can view credentials (e.g., GUIs of FIG. 2-14), interact with the authentication system 110, interact with the third-party system 130, etc. In some cases, the client application 122 can provide an interface with which users can input or select credentials or third-party applications. In some such cases, the client application 122 (along with various components of the anonymous authentication environment 100) can automatically generate, for example, anonymous QuickCodes, QuickUsernames, QuickPINs, QuickPasswords, QuickPhones, and/or QuickEmails on-the-fly and wherein the "on-the-fly" feature frees a user from manually creating anonymous data and allows the anonymous authentication system to automatically generate and manage anonymous data which can only be used by a single user of the anonymous authentication system. In this way, the client application 122 and the other components of the anonymous authentication environment 100 can obscure authentication information in networked computing systems.

The client application 122 may include a web browser, a mobile application or "app," a background process that performs various operations with or without direct interaction from a user, or a "plug-in" or "extension" to another application, such as a web browser plug-in or extension. Although FIG. 1 illustrates the client application 122 as being implemented on the client device 120, it will be understood that any of the components or systems of the anonymous authentication environment 100 may host, execute, or interact with the client application 122. Furthermore, in some cases, the client application 122 may be hosted or executed by one or more host devices (not shown), which may broadly include any number of computers, virtual machine instances, and/or data centers that are configured to host or execute one or more instances of the client application 122.

The authentication system 110 can include an anonymous authentication application 112 and a data store 118. The anonymous authentication application 112 can include a registration system 113, an activation system 114, an initialization system 115, a validation system 116, and a generation system 117.

The authentication system 110 can limit the usefulness of information in the data store 132, from the perspective of a bad actor. A bad actor may be any malicious actor or intruder seeking to gain access in an unauthorized manner to data, such as information in the data store 132. A bad actor can be a single person or computer, or a group of people or computers, which uses techniques such as hacking, phishing, or other scams for a variety of malicious reasons. Bad actors include, but are not limited to, cybercriminals, hackers, and cyberterrorists. In some cases, one or more bad actors (not shown) may attempt to connect and/or be connected to the network 140.

The authentication system 110 can limit the usefulness of information stored in the data store 132 such that should a bad actor successfully gain access to information in the data store 132, the usefulness of the data is limited. For example, as described herein, the authentication system 110 can limit the duration of time that the information is useful (e.g., by changing or updating data/credentials that has been obtained). As another example, the authentication system 110 may replace actual data (e.g., actual usernames, email addresses, passwords, names, phone numbers, etc.) with anonymous data. In this way, information stored in the data store 132 can be less valuable than it would be if the data store 132 were storing actual data. Further, should a bad actor successfully gain access to information in the data store 132, the obtained data will not be useful to the bad actor, or will not be as useful as compared to actual data.

In some cases, the anonymous authentication application 112 replaces, translates, or modifies actual client information with anonymous or fake client information, or other information that is not useful to bad actors. For example, a user's actual username and password may be replaced with an anonymous username and password that is substantially not useful to bad actors. In some cases, the client information is replaced or modified prior to being stored in the data store 132. In some cases, the client information is replaced or modified after being stored in the data store 132.

In some cases, the anonymous authentication application 112 uses one or more of the registration system 113, the activation system 114, the initialization system 115, the validation system 116, or the generation system 117 to perform the task of replacing/modifying the client information. It will be understood that although these systems are shown separately in FIG. 1, these systems may be combined or more systems may be added without departing from the scope of the present inventive concept.

The generation system 117 can generate one or more characters or strings based on a generation policy. The generation policy can indicate how or when to generate the characters or strings. In some cases, the generation policy indicates to generate a random combination of characters (e.g., numbers, letters, other characters) or a fixed or random length or format. In this way, the output may have a predefined format, length, or other requirements (e.g., include upper case, lower case, number, etc.). In some cases, the generation policy indicates to generate characters or strings according to a particular pattern or format.

In some cases, the generation system 117 is implemented as one or more random number (or character) generators for randomly generating on-the-fly, for example, codes, personal identification numbers (PINs), telephone numbers, and the like. In some embodiments, the generation system 117 may be used to randomly generate QuickCodes and/or QuickUsernames 125, on-the-fly. A QuickCode and/or QuickUsername correlates to a traditional username in conventional systems. In further embodiments, the generation system 117 may be used to randomly generate QuickPINs and/or QuickPasswords, on-the-fly. A QuickPIN and/or QuickPassword correlates to a traditional password in conventional systems. In some embodiments, the generation system 117 may be used to randomly generate QuickPhones 128, on-the-fly. A QuickPhone correlates to a telephone number. In some embodiments, the generation system 117 may be used to randomly generate QuickEmails, on-the-fly. A QuickEmail correlates to an email address. For example, the email "mjones@yahoo.com" may be converted to an anonymous QuickEmail, such as "E5G2H8BZ@changefly.email".

The authentication system 110 can include or be in communication with a data store 118. The data store 118 may be, for example, data repositories (like databases) and/or flat files that can store data. The data store 118 can be made up of one or more data stores storing application information that has been received from, or is associated with, one or more of the client device 120, the third-party entity system 130, or the authentication system 110. The application information includes information about client devices 120. For example, the application information can include, but is not limited to, a user profile for each client device 120. User data may include, for example, account information, user name, user group name, user/group credentials, user payment information, and the like. Although the data store 118 is implemented as being part of the authentication system 110, this should not be construed as limiting. For example, the data store 118 can be separate from the authentication system 110, or can include or be implemented as cloud storage, such as Amazon Simple Storage Service (S3), Elastic Block Storage (EBS) or Cloud-Watch, Google Cloud Storage, Microsoft Azure Storage, InfluxDB, etc. In some embodiments, the data store 118 may be a Structured Query Language (SQL) database. In some cases, the data store 118 includes multiple data stores 130.

In some embodiments, the anonymous authentication environment 100 may be implemented using a client-server architecture in which authentication system 110 is the server and the client devices 120 are the clients. In some such cases, the anonymous authentication application 112 at authentication system 110 can represent the server side of the client-server architecture and the client application 122 at client devices 120 can represent the client side of the client-server architecture. The authentication system 110 can be any networked computing configuration accessible via network 140 by client devices 120 that may be operated by client devices 120. The anonymous authentication environment 100, (e.g., the anonymous authentication application 112) may support a cloud computing environment. For example, the authentication system 110 can be implemented as a cloud server. The anonymous authentication application 112 is not limited to running on one authentication system 110 only. The anonymous authentication environment 100 may include multiple application servers 110 (or cloud servers) in order to ensure high-availability of computing resources.

Control software for the client device 120 may be based on the client application 122. For example, the client application 122 may be a software component at the client device 120 that is the counterpart to the anonymous authentication application 112 at the authentication system 110. For example, the client application 122 may include corresponding systems, such as a registration system 123, an activation system 124, an initialization system 125, a validation system 126, and a generation system 127. Furthermore, in some cases, the client device 120 can include a data store similar or identical to that of data store 128. In some such cases, the application data stored at or by the client application 122 may include both client device-related data and account-related data. Accordingly, any aspect described herein as being performed by the authentication system 110 can, in some cases, be performed instead or additionally by the client device 120. As a corollary, any aspect described herein as being performed by the client device 120 can, in some cases, be performed instead or additionally by the authentication system 110.

In some cases, a group of client devices 120 may be associated with each other. For example, a single user (or group of users such as a family) may own multiple client devices, such as one or more smartphones, iPads, laptops, and desktop computers, etc. In some such cases, each client device 120 may have its own device-related data, such as a public and private key pair. In addition or alternatively, each client device 120 of the group of associated client devices can have shared account information, such as account keys.

Further, at a third-party entity system 130, in some embodiments, the QuickUsernames 125 and QuickPasswords may be stored in the data store 132 for use in conventional networked systems, whereas, in some cases, the QuickCodes and QuickPINs are generally never stored as they are intended for one-time use only and expire at predetermined time intervals or at predetermined events.

In conventional networked systems, when a client device 120 logs into any third-party entity system 130, the user's authentication information and any other information may be stored in the data store 132. For example, for each client device 120, a unique User ID for that client device 120 along with his/her actual username, actual password, and/or actual other information may be stored in the data store 132. Additional information may include, for example, a telephone number. Table 1 shows an example of information stored in the data store 132 of conventional networked systems, which is actual or real user information, that may be useful to, for example, bad actors in the event of a data breach.

TABLE 1 sample third-party data of conventional networked systems

| User ID | Username | Password | Telephone |
|---|---|---|---|
| #1 | john.doe | Bowling4! | — |
| #2 | fsmith | $illyman8 | 409-762-9082 |
| #3 | mjones@yahoo.com | G8j2C3n1& | — |
| #4 | 5183648765 | Judge99% | 518-364-8765 |

By contrast, in the anonymous authentication application 112 (and/or client application 122) of the anonymous authentication environment 100, when a client device 120 logs into any third-party entity system 130, again the user's authentication information and any other information may be stored in the data store 132. However, using the anonymous authentication application 112 (and/or client application 122), instead of the user's actual username, actual password, and/or actual other information being stored in the data store 132, a QuickUsername, a QuickPassword, and, for example, a QuickPhone may be stored in the data store 132. Table 2 shows an example of information stored in the data store 132 of the anonymous authentication environment 100, and wherein anonymous user information may be stored in place of the actual or real user information. In Table 2, user #1 and user #4 are not using the anonymous authentication application 112 (and/or client application 122) while user #2 and user #3 are using Anonymous authentication application 112 (and/or client application 122). Like conventional systems, in the anonymous authentication application 112 (and/or client application 122), the unique username (e.g., QuickUsername or QuickEmail), along with a password (e.g., QuickPassword) can be used to correlate the authentication information with a client device 120.

TABLE 2 sample data structure of information stored in the data store 132 of environment 100

| User ID | Connection ID | Username | Password | Telephone |
|---|---|---|---|---|
| #1 | — | john.doe | Bowling4! | — |
| #2 | d3f0580efe | h7bwu5g2 (QuickUsername) | b6!Rjp73H#Yz (QuickPassword) | 201-763-9735 (QuickPhone) |
| #3 | e9c7b97af1 | E5G2H8BZ@changefly.email (QuickEmail) | K!v2RmS#2Wp1 (QuickPassword) | — |
| #4 | — | 5183648765 | Judge99% | 518-364-8765 |

Table 2 shows that information of user #2 and user #3 lacks any identifying information that may be useful to, for example, bad actors in the event of information in the data store 132 of a third-party entity system 130 being compromised. In the case of the QuickPhone, QuickPhone may be provided in standard phone number format, and is the user's anonymous phone number. Unlike conventional systems, in Anonymous authentication application 112 (and/or client application 122), the unique Connection ID, along with the QuickCode and the QuickPIN, are used to correlate the authentication information with a client device 120. The QuickCode and the QuickPIN do not have to be stored in the data store 132 as they are intended for one-time use only and expire at predetermined time intervals or at predetermined events. Referring still to Table 2, in the anonymous authentication application 112 (and/or client application 122), the unique Connection ID may be generated, for example, using an anonymous user ID and passcode authentication process discussed herein, for example with reference to FIG. 6.

Further, an AA user interface 142 of the client application 122 at each client device 120 may be implemented as a mobile application for smart devices, such as smartphones and tablet devices, in some embodiments. In further embodiments, the AA user interface 142 may be implemented as a web-based user interface that uses a web browser.

Figure 3:
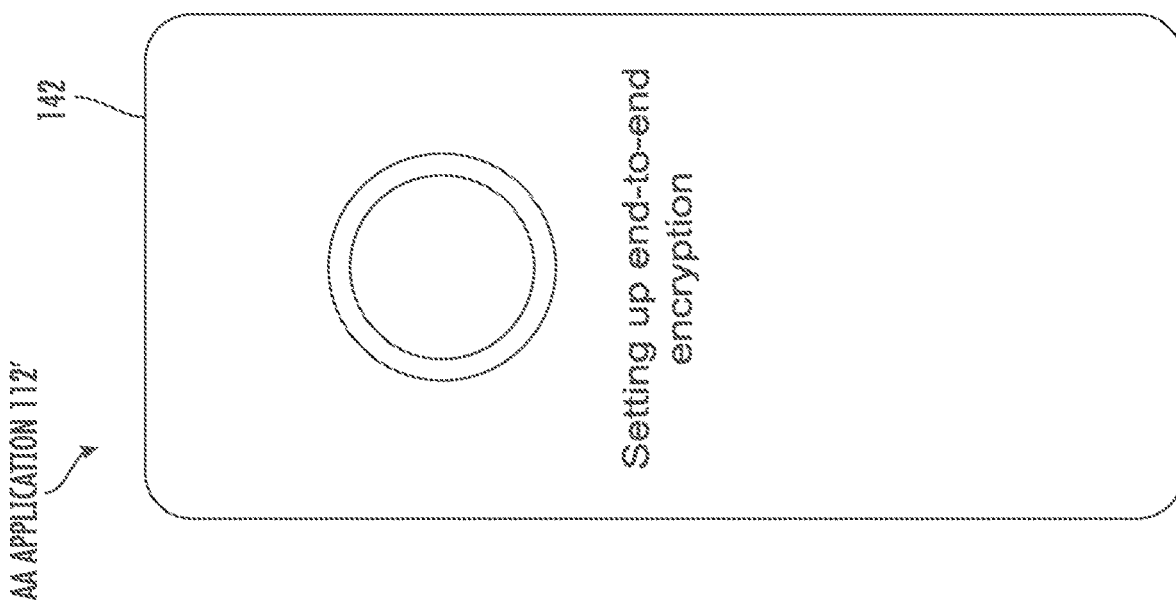
Figure 2:
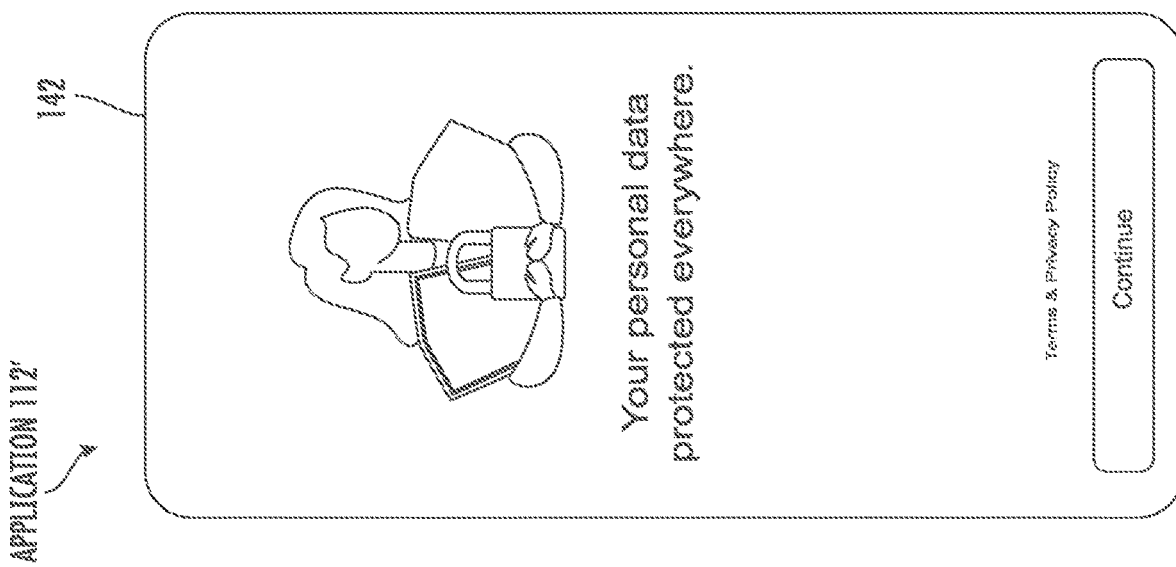
Figure 4:
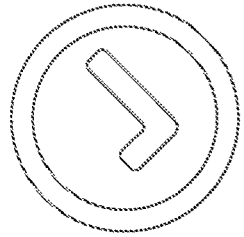
Figure 5:
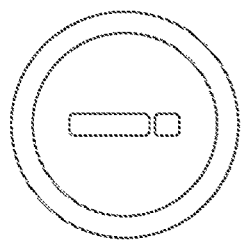

FIGS. 2-14 illustrate example graphical user interfaces (GUIs) of the client application 122. FIG. 2 shows an example of a welcome screen that may be displayed upon installing the client application 122. FIG. 3 shows the installation process setting up the end-to-end encryption keys of the client application 122. In the illustrated embodiments, a key exchange for establishing end-to-end encrypted communications takes place as described, for example, in an anonymous client registration process discussed herein with reference to FIG. 15. FIG. 4 shows an example of failing to enable the end-to-end encryption keys. FIG. 5 shows an example of successfully enabling the end-to-end encryption keys.

Figures 6, 7:
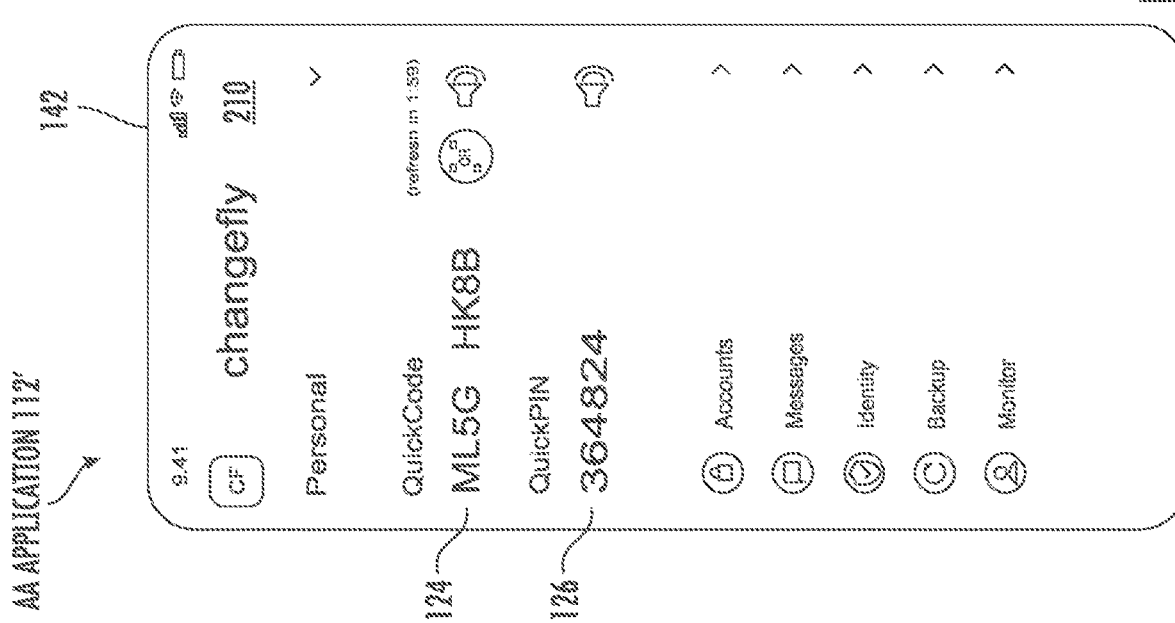

FIG. 6 and FIG. 7 show example home screens 210 of the client application 122. Each client device 120 may have multiple profiles. Profiles may include, for example, a "Personal" profile, a "Work" profile, and any other profiles (See e.g., FIG. 10, FIG. 11). Client devices 120 may create or delete profiles at will. In FIG. 6, the "Personal" profile is selected from a dropdown menu.

In some embodiments, the home screen 210 has a Quick-Code-field and a QuickPIN-field. FIG. 6 shows these fields masked with, for example, asterisks, while FIG. 7 shows these fields visible. Although FIG. 6 shows the masking using asterisks, embodiments of the present inventive concept are not limited thereto. Additionally, the QuickCode and the QuickPIN may be refreshed (e.g., updated, changed) automatically at predetermined time intervals or at predetermined events. In some embodiments, the QuickCode and the QuickPIN may refresh (update, change) automatically every few seconds or minutes. The home screen 210 may count down to the next refresh time. In further embodiments, the QuickCode and the QuickPIN may refresh (update, change) automatically when the mobile application is opened. In some embodiments, the client device 120 may prompt the client application 122 for a new QuickCode and/or new QuickPIN.

Figure 14:
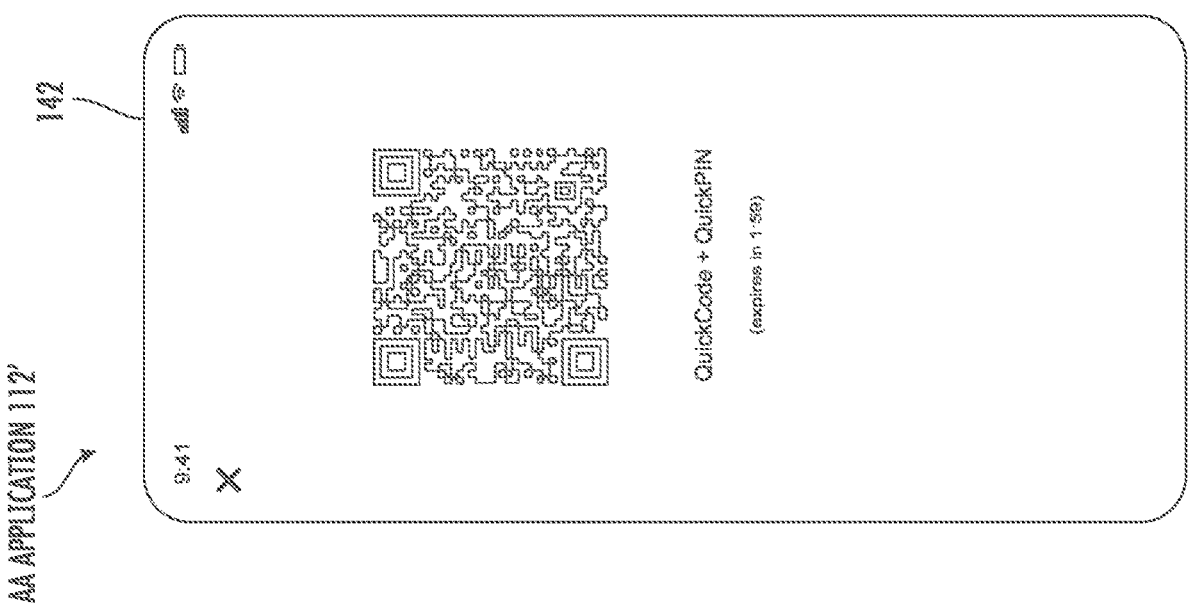

Referring still to FIG. 6 and FIG. 7, the home screen 210 has a QR code button for converting the QuickCode-field and the QuickPIN-field into a QR code (See e.g., FIG. 14). Additionally, the home screen 210 has an audio button. For example, the client device 120 may press the audio button to hear the QuickCode and QuickPIN. Additionally, the text of the home screen 210 may be displayed in a large font for easy reading. Additionally, both the text and audio of the anonymous authentication application 112 (and/or client application 122) may be provided in multiple different languages. The language may be manually or automatically selected during setup, startup, or at any other given time depending on user settings or preferences.

Figure 8:
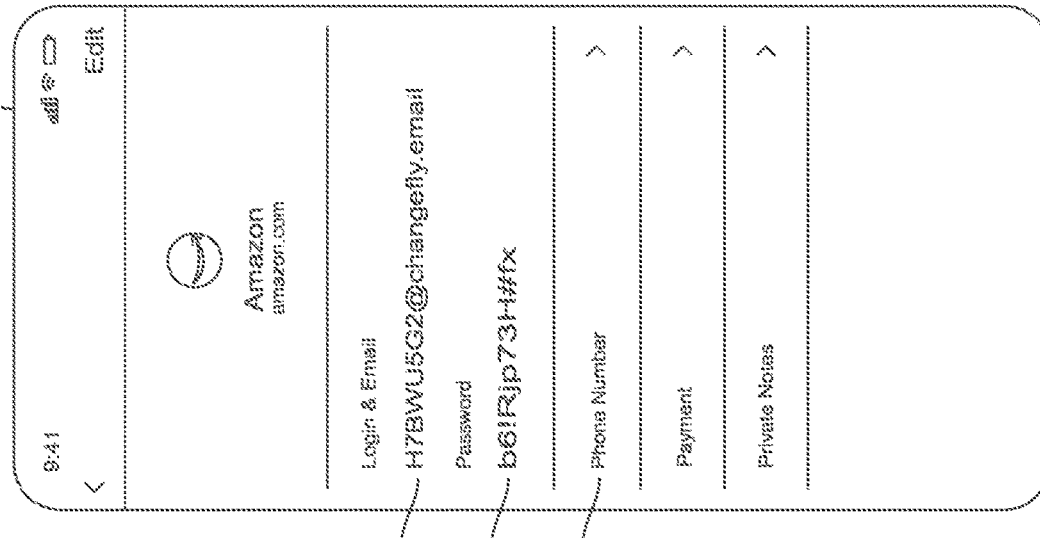
Figure 9:
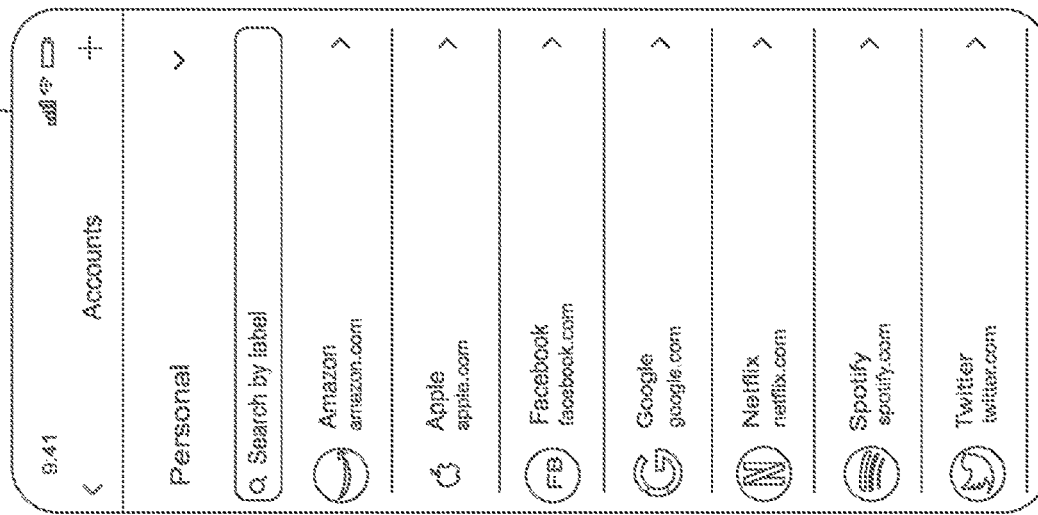

Referring still to FIG. 6 and FIG. 7, other selections may be provided at the home screen 210, for example, below the QuickCode-field and the QuickPIN-field. These selections may include, for example, accounts, messages, identity, backup, and monitor. The "accounts" may include any accounts accessed by a client device 120 and that may require authentication. The "accounts" home page may be pre-populated with several popular sites, such as Amazon, but a client device 120 may add and delete at will from the list of accounts. FIG. 8 shows an example of a list of accounts in the user's "Personal" profile. FIG. 9 shows an example of the account page of a selected account (e.g., Amazon) and showing the entry fields populated with, for example, a QuickEmail (which also acts as a QuickUsername), QuickPassword, and QuickPhone. It should be noted that the anonymous QuickUsername, anonymous QuickPassword, and anonymous QuickEmail, are unique for each account (e.g., Amazon). Further, the menu shown in FIG. 9 may be used to generate a valid phone number that is managed by the anonymous authentication environment 100.

FIG. 10 shows an example of a "Personal" profile and a "Work" profile. FIG. 11 shows an example of a "Personal" profile, a "Work" profile, and an "Acme Co." profile.

Figure 13:
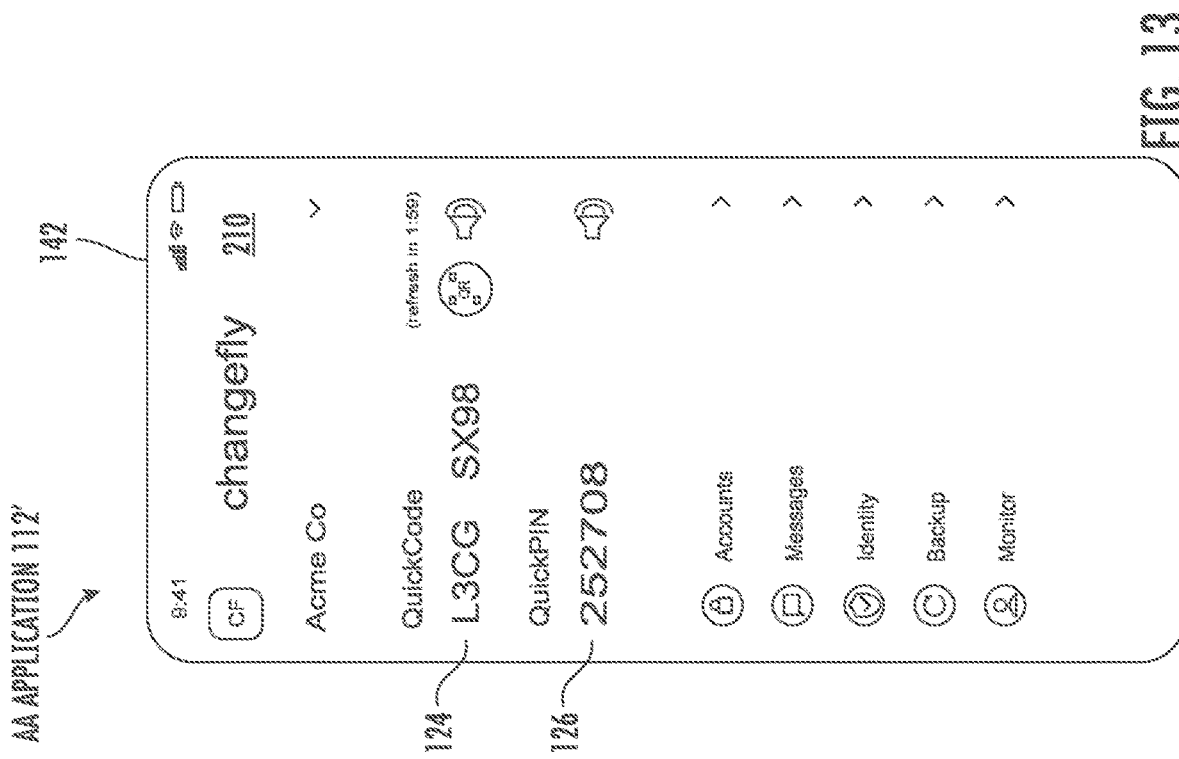
Figure 12:
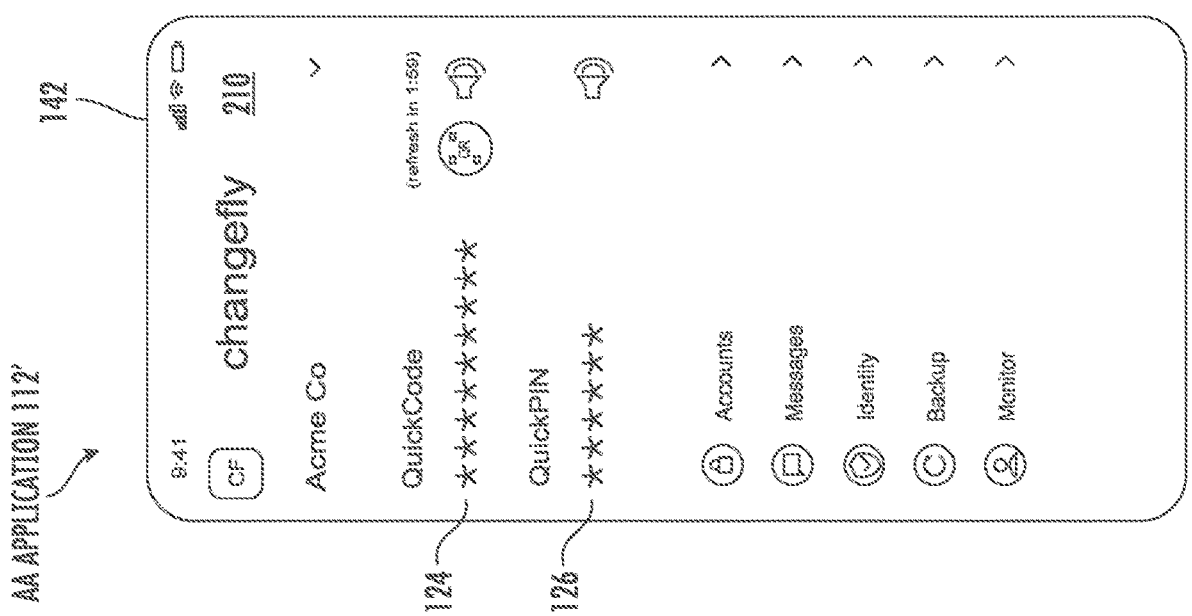

FIG. 12 and FIG. 13 show an example of the QuickCode-field and the QuickPIN-field for logging into "Acme Co." FIG. 12 shows these fields masked, while FIG. 13 shows these fields visible.

FIG. 14 shows an example of the QuickCode-field and the QuickPIN-field converted into a quick response (QR) code by clicking on the QR code button of the home screen 210.

Figure 15:
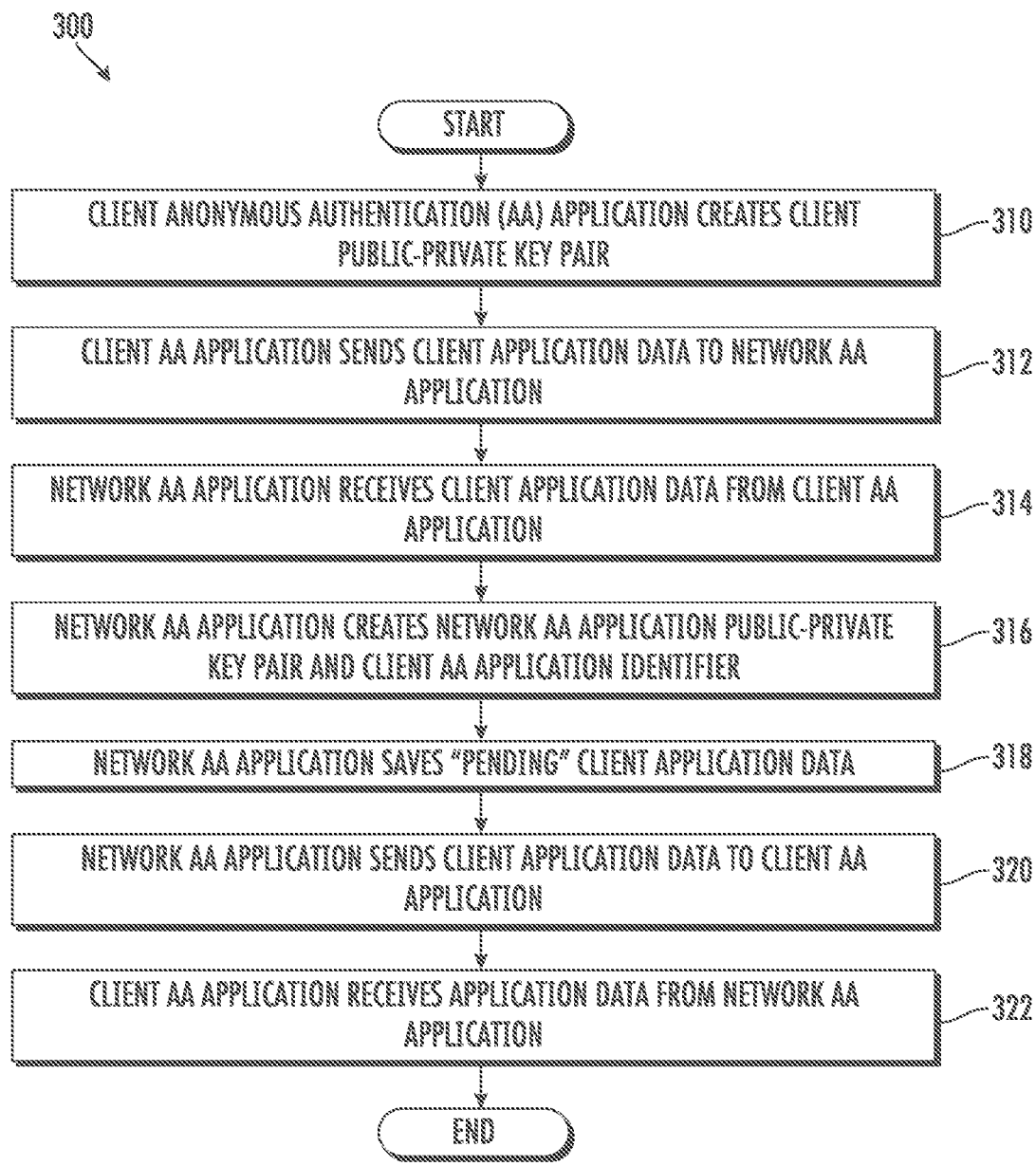
FIG. 15 illustrates a flow diagram illustrating processing steps for an anonymous client registration process in the authentication system in accordance with some embodiments of the present inventive concept.

Referring now to FIG. 15, a flow diagram illustrating a method 300, which is an example of an anonymous client registration process of the anonymous authentication environment 100 for obscuring authentication information in networked computing systems in accordance with some embodiments of the present inventive concept will be discussed. More specifically, the anonymous client registration process of the method 300 may be performed using the registration system 113 (and/or registration system 123) of the anonymous authentication environment 100.

In the method 300, "client" refers to the client in a client-server architecture, which in the anonymous authentication environment 100 may be the client application 122 at any client device 120 of any client device 120. Further, in the method 300, "network" refers to the server in a client-server architecture, which in the anonymous authentication environment 100 may be Anonymous authentication application 112 at authentication system 110.

Additionally, in the method 300, "user id (or ID)" refers to "QuickCode" (e.g., QuickCode) and "passcode" refers to "QuickPIN" (e.g., QuickPIN).

The method 300 illustrated by the flow chart in FIG. 15 may include, but is not limited to, the following steps. Further, certain steps of the method 300 may include sub-steps. For example, method step 316 includes sub-steps 316a, 316b, 316c.

At a client-side step 310, the client application 122 creates a client public-private key pair. For example, the client application 122 at client device 120 creates a client public-private key pair according to, for example:
   310a: Create CLIENT private-public key pair (client_keypair)

At a client-side step 312, the client application 122 sends client application data to the anonymous authentication application 112. For example, the client application 122 at client device 120 sends client application data to the anonymous authentication application 112 at authentication system 110 according to, for example:
   312a: Send Client information to NETWORK:
   client_app_id (client app identifier)
   client_public_key (derived from client_keypair)

At a network-side step 314, the anonymous authentication application 112 receives the client application data from the client application 122. For example, the anonymous authentication application 112 at the authentication system 110 receives the client application data from the client application 122 at client device 120.

At a network-side step 316, the anonymous authentication application 112 creates an anonymous authentication application public-private key pair and a client application identifier. For example, the anonymous authentication application 112 at the authentication system 110 creates an anonymous authentication application public-private key pair and an client application identifier according to, for example:
   316a: Create NETWORK private-public key pair (network keypair)
   316b: Create unique, cryptographically secure pseudorandom client identifier (client_id)
   316c: Encrypt client information (client_id, client_app_id, client_public_key, network_private_key, and network_public_key)

At a network-side step 318, the anonymous authentication application 112 saves the "pending" client application data. For example, the anonymous authentication application 112 at authentication system 110 saves the "pending" client application data according to, for example:
   318a: Save "pending" client (encrypted client information from 316c), using client_id as primary key.

At a network-side step 320, the anonymous authentication application 112 sends the client application data to the client application 122. For example, the anonymous authentication application 112 at the authentication system 110 sends the application data to Client application 122 at the client device 120 according to, for example:
   320a: Create plaintext json payload for CLIENT (payload, End-to-End Encrypted E2EE)
   client_id (client identifier)
   network_public_key (derived from network_keypair in 316a)
   320b: Create payload's symmetric key (symmetric_key)
   320c: Create payload's asymmetric key (payload_key), using anonymous encryption; symmetric_key is the message to encrypt, and
   client_public_key is the recipient's public key.
   320d: Create payload's nonce (payload_nonce)
   320e: Encrypt json payload (payload_encrypted) using authenticated encryption; payload is the data to encrypt, payload_nonce as the nonce, and symmetric_key as the key used both to encrypt/authenticate and verify/decrypt.
   320f: Send NETWORK data to CLIENT:
   payload_key
   payload_nonce
   payload_encrypted At a client-side step 322, the client application 122 receives the application data from the anonymous authentication application 112. For example, the client application 122 at client device 120 receives the application data from Anonymous authentication application 112 at authentication system 110 according to, for example:
   322a: Decrypt asymmetric payload_key (to get symmetric key from 320b) using payload_key (from 320c) and client_keypair (from 310a)
   322b: Decrypt payload_encrypted (to get plaintext json payload created in 320a) using payload_encrypted, payload_nonce, and symmetric_key
   322c: From decrypted NETWORK payload, verify receipt of client_id and network_public_key Referring still to FIG. 15, the method 300 may optionally include a step (not shown) to verify that it is not a robot trying to access the anonymous authentication application 112 (and/or client application 122).

Referring now to FIG. 4, a flow diagram of a method 400, which is an example of an anonymous client activation process of the anonymous authentication environment 100 for obscuring authentication information in networked computing systems in accordance with some embodiments of the present inventive concept will be discussed. More specifically, the anonymous client activation process of the method 400 may be performed using the activation system 114 (and/or activation system 124) of the anonymous authentication environment 100 in some embodiments.

In the method 400, "client" refers to the client in a client-server architecture, which in the anonymous authentication environment 100 may be the client application 122 at any client device 120 of any client device 120. Further, in the method 400, "network" refers to the server in a client-server architecture, which in the anonymous authentication environment 100 may be the anonymous authentication application 112 at authentication system 110.

Additionally, in the method 400, "user id (or ID)" refers to "QuickCode" (e.g., QuickCode) and "passcode" refers to "QuickPIN" (e.g., QuickPIN).

The method 400 may include, but is not limited to, the following steps. Further, certain steps of the method 400 may include sub-steps. For example, the method step 410 includes sub-steps 410a, 410b, 410c, and so on.

At a client-side step 410, the client application 122 creates an account public-private key pair. For example, the client application 122 at the client device 120 application creates an account public-private key pair according to, for example:
- 410a: Create ACCOUNT private-public key pair (account_keypair)
- 410b: Create plaintext json payload for NETWORK (payload, End-to-End Encrypted E2EE)
  client_id (client identifier)
  account_public_key (derived from account_keypair)
- 410c: Create payload's symmetric key (symmetric_key)
- 410d: Create payload's asymmetric key (payload_key), using anonymous encryption; symmetric key is the message to encrypt, and network_public_key (from 320a) is the recipient's public key.
- 410e: Create payload's nonce (payload_nonce)
- 410f: Encrypt json payload (payload_encrypted) using authenticated encryption; payload is the data to encrypt, payload nonce as the nonce, and symmetric_key as the key used both to encrypt/authenticate and verify/decrypt.

At a client-side step 412, the client application 122 sends client application data to the anonymous authentication application 112. For example, the client application 122 at client device 120 sends client application data to Anonymous authentication application 112 at authentication system 110 according to, for example:
- 412a: Send Client information to NETWORK:
  client_id
  payload_key
  payload_nonce
  payload_encrypted At a network-side step 414, the anonymous authentication application 112 receives the client application data from the client application 122. For example, the anonymous authentication application 112 at the authentication system 110 receives the client application data from the client application 122 at client device 120.

At a network-side step 416, the anonymous authentication application 112 retrieves the prior "pending" client application data. For example, the anonymous authentication application 112 at authentication system 110 retrieves the prior "pending" client application data according to, for example:
- 416a: Retrieve "pending" Client information (from 318a), using client_id (from 412a) as primary key.
- 416b: Decrypt asymmetric payload_key (to get symmetric_key from 410c) using payload_key (from 410d) and network_keypair (from 416a)
- 416c: Decrypt payload_encrypted (to get plaintext json payload created in 410b) using payload_encrypted, payload_nonce, and symmetric_key
- 416d: From decrypted CLIENT payload, verify receipt of client_id and account_public_key, and verify decrypted payload client_id matches "pending" Client information client_id (from 416a)
- 416e: Encrypt client information (client_id, client_app_id, client_public_key, network_private_key, and network_public_key)

At a network-side step 418, the anonymous authentication application 112 saves the "active" client application data. For example, the anonymous authentication application 112 at the authentication system 110 saves the "active" client application data according to, for example:
- 418a: Save "active" client (encrypted client information from 416e), using client_id as primary key.

At a network-side step 420, the anonymous authentication application 112 deletes the "pending" client application data. For example, the anonymous authentication application 112 at authentication system 110 deletes the "pending" client application data according to, for example:
- 420a: Delete "pending" client (from 318a)

At a network-side step 422, the anonymous authentication application 112 creates an anonymous account identifier and an anonymous profile identifier(s). For example, the anonymous authentication application 112 at the authentication system 110 creates an anonymous account identifier and an anonymous profile identifier(s) according to, for example:
- 422a: Create unique, cryptographically secure pseudorandom account identifier (account_id)
- 422b: Create one or more unique, cryptographically secure pseudorandom anonymous profile identifier(s) (anonymous_profile_id)

In some cases, at step 422b the anonymous authentication application 112 and/or client application 122 (e.g., via the anonymous_profile_id) allows a user to have multiple profiles (e.g., personal, work) under one account. Accordingly, there is both anonymous account IDs and anonymous profile IDs. For example, the client device 120 may have multiple profiles (See e.g., FIG. 10, FIG. 11), wherein the anonymous_profile_id ties to different QuickCode and QuickPIN versions. That is, the QuickCodes and QuickPINs may be different for each profile. Further, at step 422b multiple anonymous profile IDs may be created, one for each of the user's profiles.

At a network-side step 424, the anonymous authentication application 112 creates client session data. For example, Anonymous authentication application 112 at authentication system 110 creates client session data according to, for example:
- 424a: Create encrypted client session data (client_session) that contains client_id, account_id, and session_timestamp (only the NETWORK can decrypt client_session)

At a network-side step 426, the anonymous authentication application 112 sends the network application data to the client application data. For example, the anonymous authentication application 112 at the authentication system 110 sends the network application data to the client application data according to, for example:
- 426a: Create plaintext json payload for CLIENT (payload, End-to-End Encrypted E2EE)
  account_public_key (from 416c)
  anonymous_profile_id (from 422b)
  client_session (from 424a)
- 426b: Create payload's symmetric key (symmetric_key)
- 426c: Create payload's asymmetric key (payload_key), using anonymous encryption; symmetric_key is the message to encrypt, and client_public_key is the recipient's public key.
- 426d: Create payload's nonce (payload_nonce)
- 426e: Encrypt json payload (payload_encrypted) using authenticated encryption; payload is the data to encrypt, payload_nonce as the nonce, and symmetric_key as the key used both to encrypt/authenticate and verify/decrypt.
- 426f: Send NETWORK data to CLIENT:
  payload_key
  payload_nonce
  payload_encrypted At a client-side step 428, the client application 122 receives the network application data from the anonymous authentication application 112. For example, the client application 122 at the client device 120 receives the network application data from the anonymous authentication application 112 at the authentication system 110 according to, for example:

- 428a: Decrypt asymmetric payload_key (to get symmetric_key from 426b) using payload_key (from 426c) and client_keypair (from 310a)
- 428b: Decrypt payload_encrypted (to get plaintext json payload created in 426a) using payload_encrypted, payload_nonce, and symmetric_key
- 428c: From decrypted NETWORK payload, verify account_public_key, receipt of anonymous_profile_id, and receipt of client_session At a client-side step 430, the client application 122 saves the network application data and the client application data. For example, the client application 122 at the client device 120 saves the network application data and the client application data according to, for example:

- 430a: Save client_keypair, client_id, network_public_key, anonymous_profile_id, and client_session Referring still to FIG. 4, the method 400 may optionally include a step (not shown) to verify that it is not a robot trying to access the anonymous authentication application 112 (and/or client application 122).

At the completion of the methods 300 and 400, if for some reason the end-to-end encryption fails, then the message shown in, for example, FIG. 4 may be displayed to the client device 120. However, if the end-to-end encryption is successful, then the message shown in, for example, FIG. 5 may be displayed to the client device 120.

Referring now to FIG. 5, a flow diagram of a method 500, which is an example of an anonymous user ID and passcode initialization process of the anonymous authentication environment 100 for obscuring authentication information in networked computing systems in accordance with some embodiments of the present inventive concept will be discussed. More specifically, the anonymous user ID and passcode initialization process of the method 500 may be performed using the initialization system 115 (and/or initialization system 125) of the anonymous authentication environment 100.

In the method 500, "client" refers to the client in a client-server architecture, which in the anonymous authentication environment 100 may be the client application 122 at any client device 120 of any client device 120. Further, in the method 500, "network" refers to the server in a client-server architecture, which in the anonymous authentication environment 100 may be the anonymous authentication application 112 at the authentication system 110.

Additionally, in the method 500, "user id (or ID)" refers to "QuickCode" (e.g., QuickCode) and "passcode" refers to "QuickPIN" (e.g., QuickPIN).

The method 500 may include, but is not limited to, the following steps. Further, certain steps of the method 500 may include sub-steps. For example, the method step 510 includes sub-steps 510a, 510b, 510c, and so on.

At a client-side step 510, the client application 122 creates a unique pseudorandom anonymous user passcode. For example, the client application 122 at the client device 120 creates the unique cryptographically secure pseudorandom anonymous user passcode according to, for example:

- 510a: Create unique, cryptographically secure pseudorandom anonymous user passcode (anonymous_user_passcode)
- 510b: Hash anonymous_user_passcode using cryptographically secure hash function
- 510c: Create plaintext json payload for NETWORK (payload, End-to-End Encrypted E2EE)
  anonymous_profile_id (from 430a)
  anonymous_user_passcode (from 510b)
- 510d: Create payload's symmetric key (symmetric_key)
- 510e: Create payload's asymmetric key (payload_key), using anonymous encryption; symmetric_key is the message to encrypt, and network_public_key (from 430a) is the recipient's public key.
- 510f: Create payload's nonce (payload_nonce)
- 510g: Encrypt json payload (payload_encrypted) using authenticated encryption; payload is the data to encrypt, payload_nonce as the nonce, and symmetric_key as the key used both to encrypt/authenticate and verify/decrypt.

In some embodiments in steps 510a, 510b, and 510c the anonymous user passcode is sent as a "hashed" version of the passcode and not sent as the raw passcode. This is beneficial to protect against theft of this passcode information. Further, in some cases, at step 510c the anonymous profile identifier may also be included.

At a client-side step 512, the client application 122 sends the unique pseudorandom anonymous user passcode to the anonymous authentication application 112. For example, the client application 122 at the client device 120 sends the unique pseudorandom anonymous user passcode to the anonymous authentication application 112 at the authentication system 110 according to, for example:

- 512a: Send Client information to NETWORK:
  client_session (from 430a)
  payload_key
  payload_nonce
  payload_encrypted At a network-side step 514, the anonymous authentication application 112 receives the unique pseudorandom anonymous user passcode from the client application 122. For example, the anonymous authentication application 112 at the authentication system 110 receives the unique pseudorandom anonymous user passcode from the client application 122 at client device 120 according to, for example:

- 514a: Retrieve client session data using client_session (from 512a) and data storage (from 418a).
- 514b: Decrypt asymmetric payload_key (to get symmetric_key from 510d) using payload_key (from 510e) and network_keypair (from 514a)
- 514c: Decrypt payload_encrypted (to get plaintext json payload created in 510c) using payload_encrypted, payload_nonce, and symmetric_key
- 514d: From decrypted CLIENT payload, verify receipt of anonymous_profile_id and hashed anonymous_user_passcode At a network-side step 516, the anonymous authentication application 112 creates a unique pseudorandom anonymous user identifier. For example, the anonymous authentication application 112 at the authentication system 110 creates the unique pseudorandom anonymous user identifier according to, for example:

- 516a: Create unique, cryptographically secure pseudorandom anonymous user identifier (anonymous_user_id)
- 516b: Hash anonymous_user_id using cryptographically secure hash function
- 516c: Hash combined hashed anonymous_user_id (from 516b) and hashed anonymous_user_passcode (from 514c) using cryptographically secure hash function to create anonymous authentication object identifier (authentication_object_id)

516d: Create unique, cryptographically secure key salt (authentication_object_key_salt)

516e: Create a temporary cryptographically secure symmetric key (user_generated_key) derived from combined anonymous_user_id (from 516a) and hashed anonymous_user_passcode (from 514c), and authentication_object_key_salt (from 516d)

516f: Create anonymous authentication object nonce (authentication_object_nonce)

516g: Create timestamp (timestamp) for future expiration of authentication object.

516h: Encrypt anonymous authentication object data (authentication_object_data) using authenticated encryption;
authentication_object_id (from 516c), timestamp (from 516g), account_id (from 514a), client_id (from 514a), client device IP address, and anonymous_profile_id (from 514c) are the minimum data to encrypt, authentication_object_nonce (from 516f) as the nonce, and user_generated_key (from 516e) as the key used both to encrypt/authenticate and verify/decrypt.

In some embodiments in steps 516a through 516h both the anonymous user id and passcode are "hashed" and no raw data is stored, albeit the client device 120 sees the raw user id and passcode (See e.g., FIG. 7). More specifically, the hashed user id and hashed passcode are combined and hashed again. This is beneficial to protect against theft of this user id and passcode information.

Additionally in steps 516a through 516h, the information stored in authentication object data is not generally discoverable by, for example, any malicious actors, again providing a layer of protection. Namely, at step 516e the anonymous user id and hashed anonymous user passcode are combined. Further, steps 516a through 516h provide the key that is used to both encrypt/authenticate and verify/decrypt. Additionally, this key is temporary.

At a network-side step 518, the anonymous authentication application 112 saves the unique pseudorandom anonymous user identifier. For example, the anonymous authentication application 112 at the authentication system 110 saves the unique pseudorandom anonymous user identifier according to, for example:

518a: Save encrypted anonymous authentication object (authentication_object_data, authentication_object_key_salt, authentication_object_nonce), using authentication_object_id (from 516c) as primary key.

518b: Create plaintext json payload for CLIENT (payload, End-to-End Encrypted E2EE) anonymous_user_id (from 516a)

518c: Create payload's symmetric key (symmetric_key)

518d: Create payload's asymmetric key (payload_key), using anonymous encryption; symmetric_key is the message to encrypt, and client_public_key is the recipient's public key.

518e: Create payload's nonce (payload_nonce)

518f: Encrypt json payload (payload_encrypted) using authenticated encryption; payload is the data to encrypt, payload_nonce as the nonce, and symmetric_key as the key used both to encrypt/authenticate and verify/decrypt.

In some cases, in step 518b the information that is processed is anonymous (e.g., the anonymous QuickCode).

At a network-side step 520, the anonymous authentication application 112 sends the unique pseudorandom anonymous user identifier to the client application 122. For example, the anonymous authentication application 112 at the authentication system 110 sends the unique pseudorandom anonymous user identifier to the client application 122 at the client device 120 according to, for example:

520a: Send NETWORK data to CLIENT:
payload_key
payload_nonce
payload_encrypted

At a client-side step 522, the client application 122 receives the unique pseudorandom anonymous user identifier from the anonymous authentication application 112. For example, the client application 122 at the client device 120 receives the unique pseudorandom anonymous user identifier from the anonymous authentication application 112 at the authentication system 110 according to, for example:

522a: Decrypt asymmetric payload_key (to get symmetric_key from 518c) using payload_key (from 518d) and client_keypair (from 310a)

522b: Decrypt payload_encrypted (to get plaintext json payload created in 518b) using payload_encrypted, payload_nonce, and symmetric_key 522c: From decrypted NETWORK payload, verify receipt of anonymous_user_id (from 518b)

At a client-side step 524, the client application 122 displays the anonymous user identifier and passcode at the client user interface. For example, the client application 122 at the client device 120 displays the anonymous user identifier and passcode using the AA user interface 142 in one of multiple ways according to, for example:

524a: On client display, show anonymous_user_id (from 522b) and anonymous_user_passcode (from 510a)

524b: Optionally, for privacy, anonymous_user_id and anonymous_user_passcode could be plaintext or masked (for example, by asterisks ******)

524c: Optionally, audio playback of anonymous_user_id and anonymous_user_passcode 524d: Optionally, QR code, Bluetooth, NFC, and various other methods can also be used to extend delivery of anonymous_user_id and anonymous_user_passcode in a quick and convenient way.

In some cases, in step 524a the raw form of the anonymous user id and anonymous passcode may be displayed to the client device 120, as shown, for example, in FIG. 7.

Referring still to FIG. 5, the method 500 may optionally include a step (not shown) to verify that it is not a robot trying to access the anonymous authentication application 112 (and/or client application 122).

Referring now to FIG. 6, a flow diagram of a method 600, which is an example of an anonymous user ID and passcode authentication process of the anonymous authentication environment 100 for obscuring authentication information in networked computing systems in accordance with some embodiments of the present inventive concept will be discussed. More specifically, the anonymous user ID and passcode authentication process of the method 600 may be performed using the generation system 117 (and/or generation system 127) of the anonymous authentication environment 100.

In the method 600, "client" refers to the client in a client-server architecture, which in the anonymous authentication environment 100 may be the client application 122 at any client device 120 of any client device 120. Further, in the method 600, "network" refers to the server in a client-server architecture, which in the anonymous authentication environment 100 may be the anonymous authentication application 112 at authentication system 110. Further, in the method 600, "third-party" refers to any networked or online service provider, such as a third-party entity system 130, that is processing anonymous information of the anonymous authentication application 112 (and/or client application 122).

Additionally, in method 600, "user id (or ID)" refers to "QuickCode" (e.g., QuickCode) and "passcode" refers to "QuickPIN" (e.g., QuickPIN).

The method 600 may include, but is not limited to, the following steps. Further, certain steps of the method 600 may include sub-steps. For example, the method step 612 may include sub-steps 612a, 612b, 612c.

At a third-party-side step 610, a user logs into a third-party entity using an anonymous user ID and passcode generated using the anonymous authentication application 112 of the anonymous authentication environment 100. For example, using his/her client device 120, a client device 120 may access the interface of any third-party entity system 130 and submit an anonymous user ID and passcode generated using the anonymous authentication environment 100 and, for example, the method 300 of FIG. 15, the method 400 of FIG. 4, and/or the method 500 of FIG. 5.

At a third-party-side step 612, the third-party entity processes the anonymous user ID and passcode and then sends third-party data to the anonymous authentication application 112. For example, a third-party entity system 130 may process the anonymous user ID and passcode and then send information in the data store 132 to the anonymous authentication application 112 at the authentication system 110. Further, for backwards compatibility with traditional username and password interfaces, the third-party entity system 130 may permit anonymous_user_id as username, and anonymous_user_passcode as the password. Further, the third-party entity system 130 may check the local match of username and password before trying to check anonymous_user_id and anonymous_user_passcode with the anonymous authentication application 112 at the authentication system 110. The information in the data store 132 may be sent to the anonymous authentication application 112 at authentication system 110 according to, for example:

612a: THIRD-PARTY creates plaintext json payload for NETWORK (payload):
    api_key (unique, private key previously assigned by NETWORK) anonymous_user_id (from 610)
    anonymous_user_passcode (from 610)
    612b: Optionally, THIRD-PARTY could create End-to-End Encrypted E2EE payload
    612c: Send THIRD-PARTY data (from 612a) to NETWORK via TLS or E2EE payload In some cases, at step 612a the third-party data is anonymous (e.g., the anonymous QuickCode and the anonymous QuickPIN).

At a network-side step 614, the anonymous authentication application 112 receives and processes third-party data including the anonymous user ID and passcode. For example, the anonymous authentication application 112 at the authentication system 110 receives and processes information in the data store 132 including the anonymous user ID and passcode according to, for example:

614a: From THIRD-PARTY payload (plaintext json or E2EE decrypted), verify receipt of api_key, anonymous_user_id, and anonymous_user_passcode.
    614b: Lookup api_key credentials to retrieve THIRD-PARTY anonymous profile identifier (third party_anonymous_profile_id)
    614c: Hash anonymous_user_id using cryptographically secure hash function
    614d: Hash anonymous_user_passcode using cryptographically secure hash function
    614e: Hash combined hashed anonymous_user_id (from 614c) and hashed anonymous_user_passcode (from 614d) using cryptographically secure hash function to create anonymous authentication object identifier (authentication_object_id)

In some embodiments, at steps 614a through 614e both the anonymous user id and passcode are "hashed" and then the hashed user id and hashed passcode are combined and hashed again. This is beneficial to protect against theft of this user id and passcode information.

At a network-side step 616, the anonymous authentication application 112 processes the anonymous authentication request and returns an approval or denial to the third-party entity system 130. For example, the anonymous authentication application 112 at the authentication system 110 processes the anonymous user ID and passcode and returns an approval or denial to the third-party entity system 130 according to, for example:

616a: Retrieve anonymous authentication object (authentication_object_data, authentication_object_key_salt, authentication_object_nonce), using authentication_object_id (from 614e) as primary key.
    616b: Create a temporary cryptographically secure symmetric_key (user_generated_key) derived from combined anonymous_user_id (from 614a), hashed anonymous_user_passcode (from 614d), and authentication_object_key_salt (from 616a)
    616c: Decrypt anonymous authentication_object_data (anonymous_object_data, from 616a) using authenticated decryption;
    authentication_object_id (from 614e), timestamp (from 516g), account_id (from 514a), client_id (from 514a), client device IP address, and anonymous_profile_id (from 514c) are the minimum data to decrypt, authentication_object_nonce (from 616a) as the nonce, and user_generated_key (from 616b) as the key used to verify/decrypt.
    616d: Optionally, expire authentication object depending on timestamp (from 616c)
    616e: Combine anonymous_profile_id (from 616c) (conductor) with third party anonymous_profile_id (from 614b) (recipient) and hash combined values using cryptographically secure hash function, to create unique connection identifier (connection_id)
    616f: Optionally, NETWORK could send real-time notification to CLIENT for request to approve/deny authentication.
    616g: On success, delete the authentication object (authentication_object_id)
    616h: On failure between steps 614a-616g, NETWORK creates plaintext json payload for THIRD-PARTY (payload):
    success (value: false)
    616i: On success between steps 614a-616g, NETWORK creates plaintext json payload for THIRD-PARTY (payload):
    success (value: true)
    connection_id (from 616e) optional metadata
    616j: Optionally, NETWORK could create End-to-End Encrypted E2EE payload
    616k: Send NETWORK data (616h or 616i) to THIRD-PARTY via TLS or E2EE payload In some cases, at step 616b a temporary symmetric key is created using the combined user id, hashed user passcode, and key salt from the authentication object.

Further, in some cases, at step 616e the third-party uses a unique connection identifier in order to identify the user that is attempting to anonymously authenticate.

At a third-party-side step 618, the third-party entity verifies the anonymous authentication approval or denial received from the anonymous authentication application 112. For example, the third-party entity system 130 verifies the anonymous authentication approval or denial received from the anonymous authentication application 112 at the authentication system 110 according to, for example:

618a From NETWORK payload (plaintext json or E2EE decrypted), verify receipt of success (value false or true), connection_id, and optional metadata.

Referring still to FIG. 6, the method 600 may optionally include a step (not shown) to verify that it is not a robot trying to access the anonymous authentication application 112 (and/or client application 122).

Referring now to FIG. 7, a flow diagram of a method 700 of obscuring authentication information in networked computing systems using the anonymous authentication environment 100 in accordance with some embodiments of the present inventive concept will be discussed. In the method 700, "user id (or ID)" refers to "QuickCode" (e.g., Quick-Code) and "passcode" refers to "QuickPIN" (e.g., Quick-PIN). The method 700 may include, but is not limited to, the following steps.

At a step 710, an anonymous authentication system is provided. For example, the anonymous authentication environment 100 (See e.g., FIG. 1) including the anonymous authentication application 112 at the authentication system 110 and the client application 122 at the client devices 120 may be provided.

At a step 712, an anonymous client registration process of the anonymous authentication system is performed. For example, the anonymous client registration process 300 as discussed hereinabove with reference to FIG. 15 may be performed.

At a step 714, an anonymous client activation process of the anonymous authentication system is performed. For example, the anonymous client activation process 400 as described hereinabove with reference to FIG. 4 may be performed.

At a step 716, an anonymous user ID and passcode initialization process of the anonymous authentication system is performed. For example, the anonymous user ID and passcode initialization process 500 as described hereinabove with reference to FIG. 5 may be performed.

At a step 718, the anonymous authentication system is utilized to access third-party online entities in a secure manner. For example, Anonymous authentication environment 100 (See e.g., FIG. 1) including the anonymous authentication application 112 at the authentication system 110 and the client application 122 at the client devices 120 may be utilized to access the a third-party entity system 130 in a secure manner.

At a step 720, an anonymous user ID and passcode authentication process of the anonymous authentication system is performed. For example, the anonymous user ID and passcode authentication process 600 as described hereinabove with reference to FIG. 6 may be performed.

Referring now to FIG. 1 through FIG. 7, the anonymous authentication environment 100 and the methods 300, 400, 500, 600, 700 for obscuring authentication information in networked computing systems may provide certain benefits.

In some embodiments, the anonymous authentication environment 100 and methods 300, 400, 500, 600, 700 may be used with any legacy style of access that uses a login screen with a username and password. For example, the anonymous authentication environment 100 and the methods 300, 400, 500, 600, 700 may run alongside or on top of any legacy system and anonymous QuickCodes and Quick-PINs may be used instead of the traditional usernames and passwords.

In further embodiments, the anonymous authentication environment 100 and the methods 300, 400, 500, 600, 700 may be used to provide an easy and convenient username and password management application that may be used to remove the barrier of users having to remember and/or maintain a list of usernames and passwords.

In still further embodiments, the anonymous authentication environment 100 and the methods 300, 400, 500, 600, 700 may provide a high degree of privacy and security for client devices 120 in that the stored information in the data store 132 of a third-party entity system 130 may include, for example, anonymous QuickCodes, QuickPINs, Quick-Phones 128, and/or QuickEmails rather than, for example, traditional usernames, passwords, telephone numbers, and email addresses.

In some embodiments, the anonymous authentication environment 100 and the methods 300, 400, 500, 600, 700 may be used to automatically generate, for example, the anonymous QuickCodes, QuickUsernames 125, QuickPINs, QuickPasswords, QuickPhones 128, and/or QuickEmails on-the-fly and wherein the "on-the-fly" feature frees a user from manually creating anonymous data and allows the anonymous authentication system to automatically generate and manage anonymous data which can only be used by a single user of the anonymous authentication system. For example, if an anonymous QuickEmail stored in information in the data store 132 becomes compromised, the anonymous authentication system can generate a new anonymous QuickEmail for information in the data store 132 and block or prevent the compromised anonymous QuickEmail from future use.

In further embodiments, the anonymous authentication environment 100 and the methods 300, 400, 500, 600, 700 may be used to provide another security measure with respect to a third-party entity system 130 so when a third-party entity system 130 recognizes a breach of their information in the data store 132, the third-party entity system 130 itself may automatically prompt the anonymous authentication application 112 (and/or client application 122) of the anonymous authentication environment 100 for new Quick-Codes, QuickUsernames 125, QuickPINs, QuickPasswords, QuickPhones 128, and/or QuickEmails for their client devices 120 and without requiring that the client devices 120 be aware.

In still further embodiments, the anonymous authentication environment 100 and the methods 300, 400, 500, 600, 700 may be used to provide an easy and convenient anonymous backup and/or recovery management application. This anonymous backup and/or recovery management application may be used to remove the barrier of users having to remember and/or maintain a list of one-time use backup/recovery codes, time-based one-time passwords (TOTP), or email and/or phone-based authentication/verification (all of which access to can be lost). For example, one or more a third-party entity system 130 may be entrusted to encrypt (backup) or decrypt (recover) user data using a combination of something the client device 120 knows (e.g., full name, driver's license, etc., all of which is cryptographically hashed) or has (QuickCode' and QuickPIN'), and something trusted third-party entity system 130 knows or has (third-party entity system 130 QuickCode and third-party entity system 130 QuickPIN). Third-party entity systems 130 may be trusted family members, trusted friends, or any other trusted third-party. Also, a plurality of Third-party entity systems 130 may require a quorum to encrypt (backup) or decrypt (recover) client device 120 backup data. Furthermore, an anonymous backup and recovery management application may require both client device 120 and trusted third-party entity system 130 to work together to backup and/or recover user data, thereby providing a high degree of privacy and security for client device 120 backup data.

Figure 20:
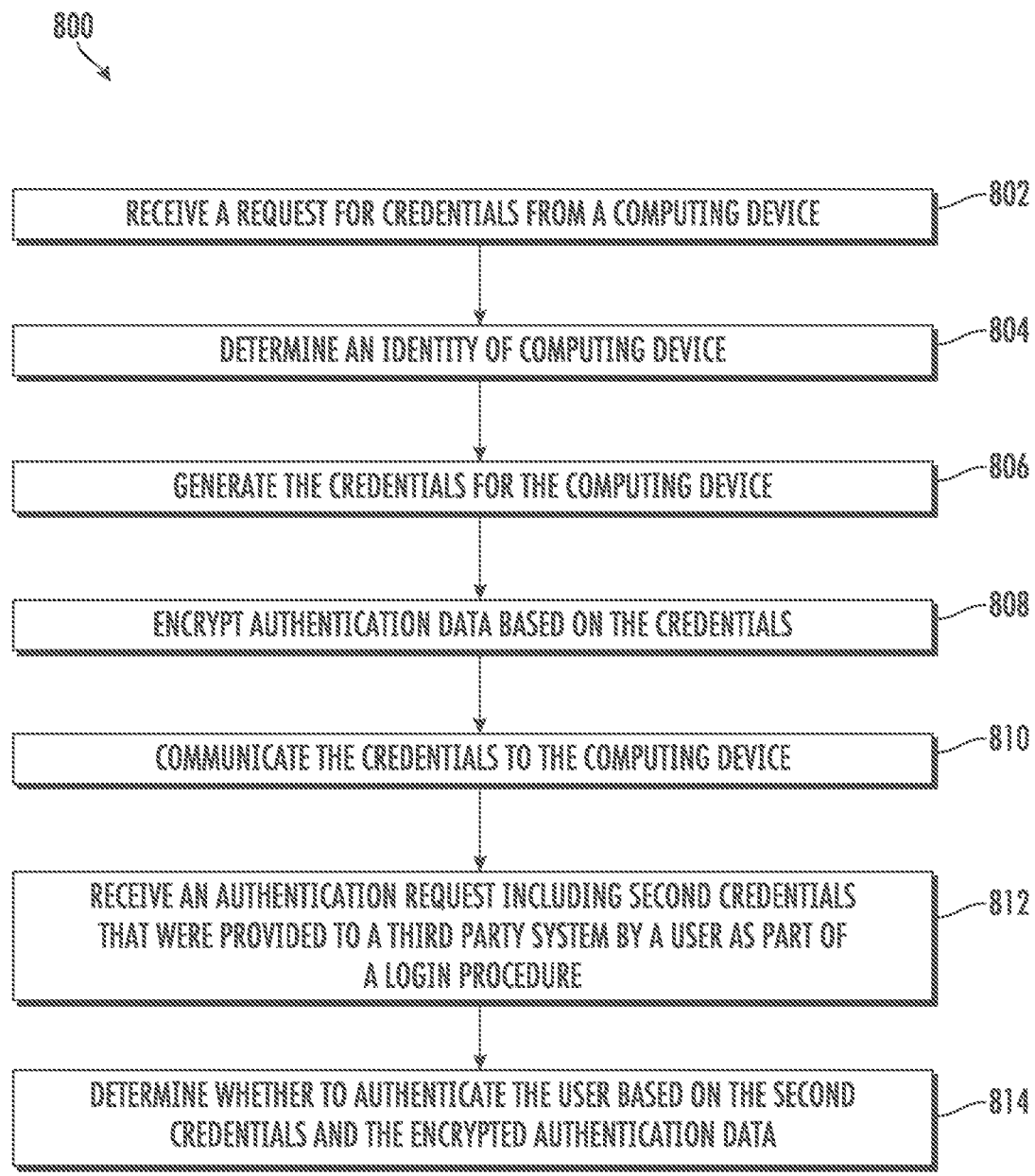
FIG. 20 is a flow diagram illustrative of an embodiment of a routine implemented by a computing device of the anonymous authentication environment.

FIG. 20 is a flow diagram illustrative of an embodiment of a routine 800 implemented by a computing device of the anonymous authentication environment 100. Although described as being implemented by the authentication system 110, it will be understood that the elements outlined for routine 800 can be implemented by one or more computing devices/components that are associated with the anonymous authentication environment 100, such as, but not limited to, the anonymous authentication application 112, the client application 122, the client device 120, the third-party entity system 130, etc. Thus, the following illustrative embodiment should not be construed as limiting. Furthermore, fewer, more, or different blocks can be used as part of the routine 800.

At block 802, the authentication system 110 receives a request for credentials from a client device 120. As described herein, it can be desirable for an individual to use unique credentials (e.g., username and password) to authenticate herself when accessing a third-party application, such as an application for a financial institution, utility company, healthcare provider, entertainment provider, retailer, online shopping company, travel company, or the like. However, rather than keep track of these credentials herself (as well credentials for other applications), the individual can utilize the authentication system 110 to authenticate the individual and supply anonymous credentials that can be used to access/login to the third-party application. As part of the process, the individual (via the client device 120) can communicate a request for credentials to the authentication system 110.

Figure 16:
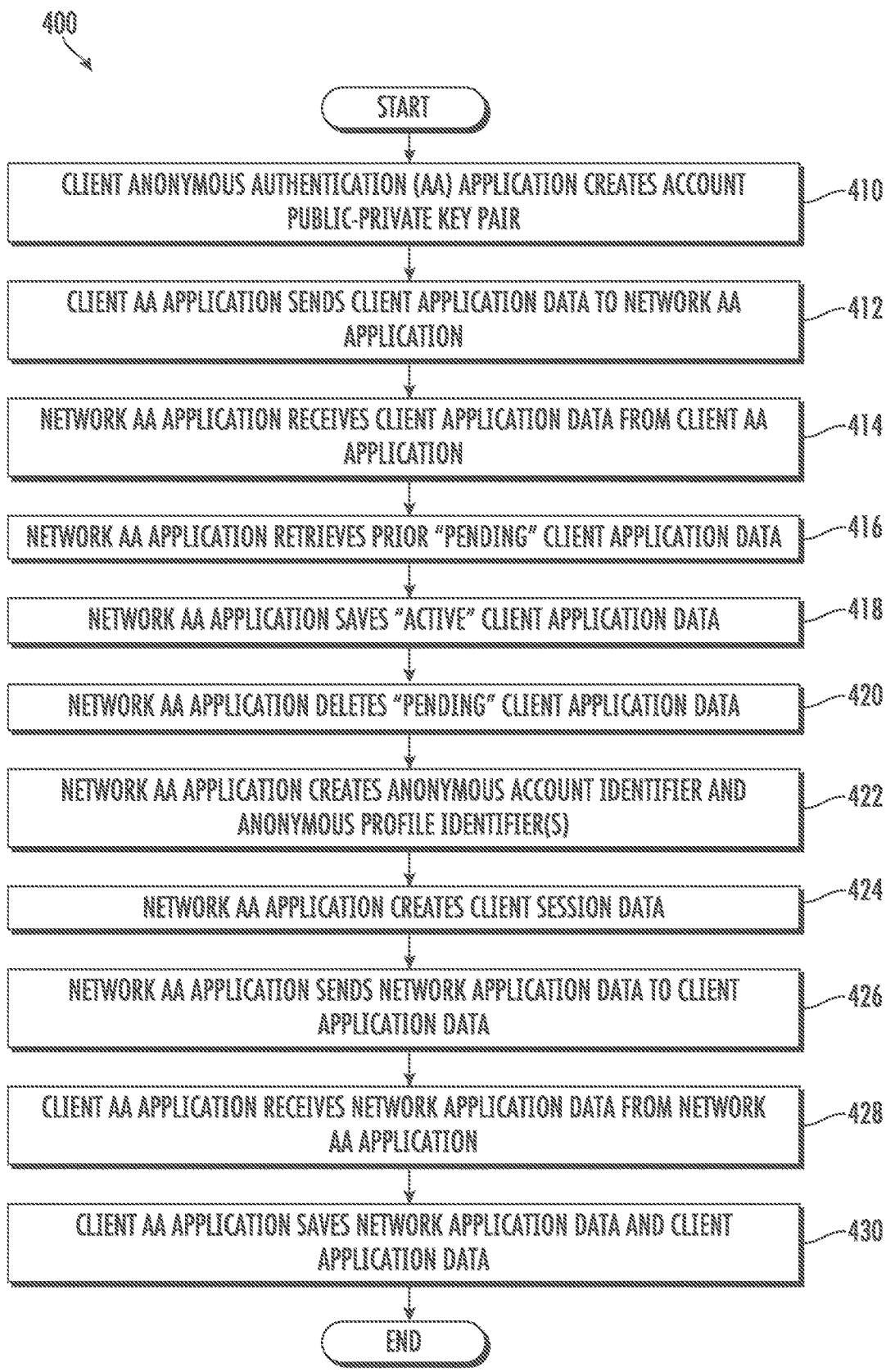
FIG. 16 illustrates a flow diagram illustrating processing steps for an anonymous client activation process in the authentication system in accordance with some embodiments of the present inventive concept.

The content of the request can vary across embodiments. For example, in some cases, the request can include an identifier that uniquely identifies the client device 120 and/or the individual to the authentication system 110. For example, the identifier can include, but is not limited to, a point of presence (e.g., an IP address), an alphanumeric code, an anonymous_profile_id, or the like. As another example, the identifier can be part of a larger data set provided to the authentication system 110. For example, as described herein (e.g., with respect to FIG. 16), during an anonymous client activation process, the authentication system 110 can create client session data (e.g., a client ID, an account ID, a session timestamp, or other client device identifier) and communicate the client session data to the client device 120. In some cases, the authentication system 110 encrypts the client session data prior to communicating it to the client device 120, and the client session data is encrypted such that only the authentication system 110 can decrypt it. In some such cases, by providing the encrypted client session data to the authentication system 110, the client device 120 can provide a client device identifier to the authentication system 110.

In some cases, the request for credentials can itself include credentials. For example, some cases, the request for credentials can be a request for a username (e.g., a Quick-Code) or other identifier (QuickPhones, QuickEmails, etc.) and can include a password or passcode generated, selected, or otherwise obtained by the client device 120 (e.g., a QuickPin). As another example, in some cases, the request for credentials can be a request for a password and can include a username generated, selected, or otherwise obtained by the client device 120. In some cases, the credentials included as part of the request can be cryptographically generated and secure. In some cases, the client device 120 hashes the credentials using cryptographically secure hash function before sending them to the authentication system 110.

At block 804, the authentication system 110 determines the identity of the client device 120. In some cases, the authentication system 110 determines the identity of the client device 120 in order to assign credential to that device. As described herein, the client device 120 provide a client device identifier, which the authentication system 110 can use to determine the identity of the client device 120.

Figure 17:
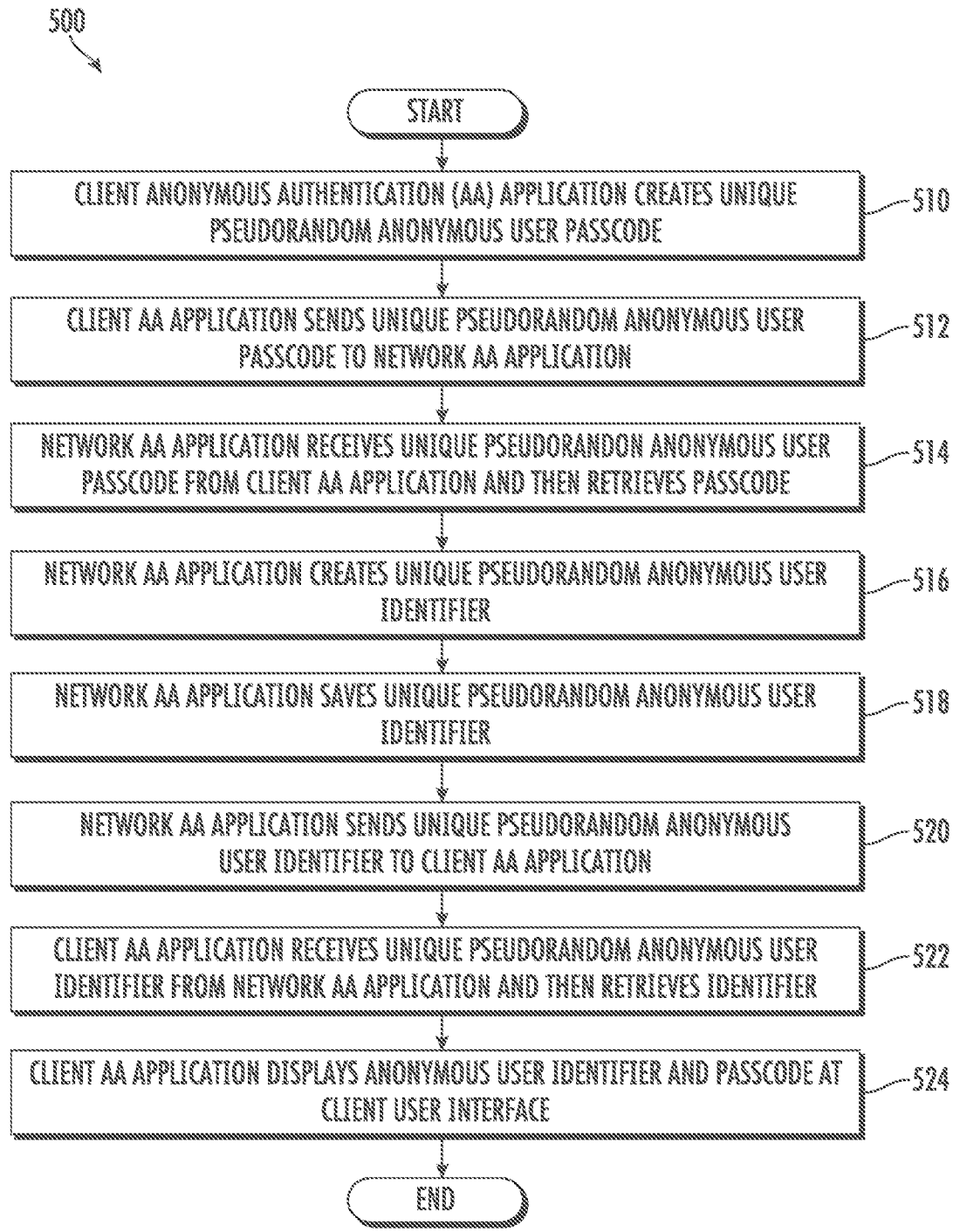
FIG. 17 illustrates a flow diagram illustrating processing steps for an anonymous user ID and passcode initialization process in the authentication system in accordance with some embodiments of the present inventive concept.
Figure 18:
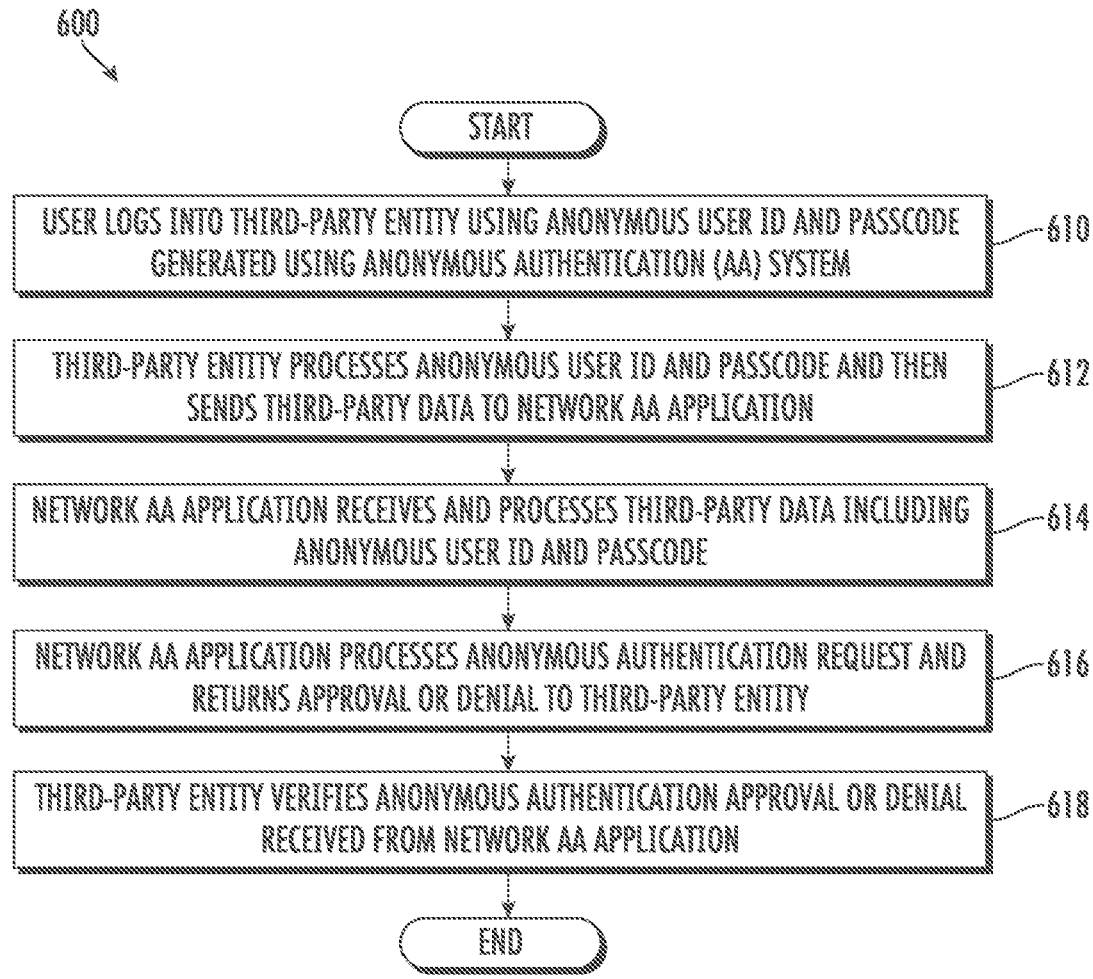
FIG. 18 illustrates a flow diagram illustrating processing steps for an anonymous user ID and passcode authentication process in the authentication system in accordance with some embodiments of the present inventive concept.
Figure 19:
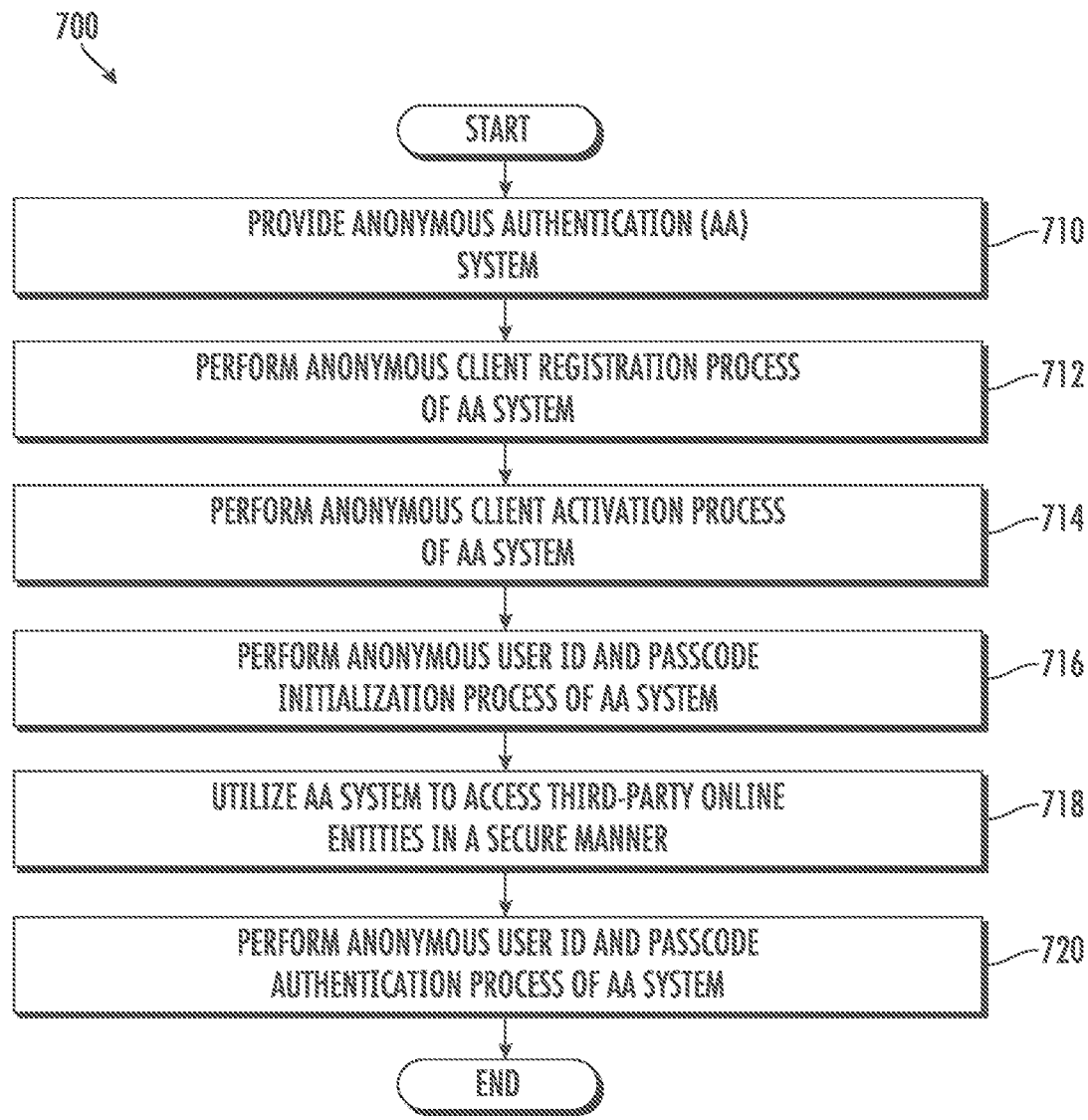
FIG. 19 illustrates a flow diagram illustrating processing steps for using the authentication system in accordance with some embodiments of the present inventive concept.

At block 806, the authentication system 110 generates the credentials for the client device 120. As described herein, for example with respect to block 516 of FIG. 17, the authentication system 110 can create credentials, such as a unique pseudorandom anonymous user identifier.

At block 808, the authentication system 110 encrypts authentication data based on the credentials. As described herein, for example with respect to block 518 of FIG. 17, the authentication system 110 can encrypt the credentials.

At block 810, the authentication system 110 communicates the credentials to the client device 120. As described herein, the credentials can be stored and/or viewable on the client device 120. Furthermore, in some cases, the authentication system 110 may encrypt the credentials prior to sending to the client device 120. In some such cases, the client device 120 can decrypt the encrypted credentials, for example using a public/private key pair.

At block 812, the authentication system 110 receives an authentication request to authenticate a user as part of a login procedure for a third-party application. For example, the authentication request can be tied to a request by a user to log in to a third-party application. In some cases, the request to authenticate the user further includes an API key that is a unique, private key previously assigned to the third-party entity system by the authentication system. By providing the API key to the authentication system 110, the third-party system can provide its identity to the authentication system 110.

At block 814, the authentication system 110 determines whether to authenticate the user and communicates an authentication decision to the third-party entity system. The authentication decision can vary across embodiments. For example, if the authentication system 110 determines that the user is authenticated, then the authentication decision indicates an approval of the user. As a corollary, if the authentication system 110 determines that the user is not authenticated, then the authentication decision indicates a denial of the user. In some cases, the authentication decision indicates an approval of the user based on at least one of a determination that the second key is usable to decrypt the client authentication data or a determination that the second authentication identifier matches the first authentication identifier. In some cases, the authentication decision indicates a denial of the user based on a determination that the second key is not usable to decrypt the client authentication data. In some cases, the authentication decision indicates a denial of the user based on a determination that the second authentication identifier does not match the first authentication identifier. In some cases, the first key is assigned an expiration period, and the authentication decision indicates a denial of the user based on a determination that the expiration period is expired.

Example Embodiments

Various example embodiments of grips can be found in the following clauses:

Clause 1. A method performed by an authentication system for authenticating a computing device, the method comprising:
 receiving a request for a first credential from a computing device, wherein the request comprises a second credential generated by the computing device and encrypted session data, wherein the encrypted session data corresponds to a prior authentication of the computing device by the authentication system;
 decrypting the encrypted session data to obtain decrypted session data;
 determining a user identifier based on the decrypted session data;
 generating the first credential;
 generating a first authentication identifier based on the first credential, the second credential, and a cryptographically secure hash function;
 generating a first key based on the first credential and the second credential;
 encrypting client authentication data using the first key as a key to create encrypted client authentication data, wherein the client authentication data comprises the first authentication identifier;
 communicating the first credential to the computing device, wherein the computing device uses the first credential and the second credential to log in to a third-party entity system;
 receiving, from the third-party entity system, a request to authenticate a user, wherein the request to authenticate the user includes a set of credentials provided by the user as part of a login procedure for an application associated with the third-party entity system;
 generating a second authentication identifier based on the set of credentials and the cryptographically secure hash function;
 creating a second key based on the set of credentials; and/or
 communicating an authentication decision to the third-party entity system based at least in part on the second authentication identifier and the second key.

Clause 2. The method of any of clause 1, wherein the authentication decision indicates an approval of the user based on at least one of a determination that second key is usable to decrypt the client authentication data or a determination that the second authentication identifier matches the first authentication identifier.

Clause 3. The method of any of the preceding clauses, further comprises:
 decrypting the client authentication data using the second key to obtain the first authentication identifier; and
 comparing the second authentication identifier to the first authentication identifier,
 wherein the authentication decision indicates an approval of the user based on a determination that the second authentication identifier matches the first authentication identifier.

Clause 4. The method of any of the preceding clauses, wherein the authentication decision indicates a denial of the user based on a determination that second key is not usable to decrypt the client authentication data.

Clause 5. The method of any of the preceding clauses, wherein the authentication decision indicates a denial of the user based on a determination that the second authentication identifier does not match the first authentication identifier.

Clause 6. The method of any of the preceding clauses, wherein the first key is assigned an expiration period, wherein the authentication decision indicates a denial of the user based on a determination that the expiration period is expired.

Clause 7. The method of any of the preceding clauses, wherein the first credential is a quickcode, and wherein the second credential is a quickpin.

Clause 8. The method of any of the preceding clauses, wherein the request to authenticate the user further comprises an API key, wherein the API key is a unique, private key previously assigned to the third-party entity system by the authentication system.

Clause 9. The method of any of the preceding clauses, wherein the second credential is a hashed version of a third credential, wherein the third credential is generated by the computing device accordingly to a generation policy.

Clause 10. The method of any of the preceding clauses, wherein said generating the first authentication identifier comprises:
 hashing the first credential to create a hashed first credential; and
 hashing the hashed first credential and the second credential to create the first authentication identifier.

Clause 11. The method of any of the preceding clauses, further comprising creating an authentication object key salt, wherein generating the first key is based on the authentication object key salt.

Clause 12. A computer-implemented method performed by an authentication system for authenticating a computing device, the method comprising:
 receiving, from a third-party entity system, a request to authenticate a user, wherein the request to authenticate the user includes a set of credentials provided by the user as part of a login procedure for an application associated with the third-party entity system;
 generating an authentication identifier based on the set of credentials and a cryptographically secure hash function;
 creating a decryption key based on the set of credentials; and
 decrypting client authentication data using the decryption key to obtain a stored authentication identifier;
 comparing the authentication identifier to the stored authentication identifier; and
 communicating an authentication decision to the third-party entity system based at least in part on said comparing, wherein the authentication decision indicates an approval of the user based on a determination that the authentication identifier matches the stored authentication identifier, wherein the authentication decision indicates a denial of the user based on a determination that the authentication identifier does not match the stored authentication identifier.

Clause 13. The method of clause 12, wherein the decryption key is assigned an expiration period, wherein the authentication decision indicates a denial of the user based on a determination that the expiration period is expired.

Clause 14. An authentication system comprising memory; and one or more processors coupled to the memory and configured to:

receive a request for a first credential from a computing device, wherein the request comprises a second credential generated by the computing device and encrypted session data, wherein the encrypted session data corresponds to a prior authentication of the computing device by the authentication system;

decrypt the encrypted session data to identify an account user;

generate the first credential;

generate a first authentication identifier based on the first credential, the second credential, and a cryptographically secure hash function;

generate a first key based on the first credential and the second credential;

encrypt client authentication data using the first key as a key to create encrypted client authentication data, wherein the client authentication data comprises the first authentication identifier;

communicate the first credential to the computing device, wherein the computing device uses the first credential and the second credential to log in to a third-party entity system;

receive, from the third-party entity system, a request to authenticate a user, wherein the request to authenticate the user includes a set of credentials provided by the user as part of a login procedure for an application associated with the third-party entity system;

generate a second authentication identifier based on the set of credentials and the cryptographically secure hash function;

create a second key based on the set of credentials; and/or communicate an authentication decision to the third-party entity system based at least in part on the second authentication identifier and the second key.

Clause 15. The authentication system of clause 14, wherein the authentication decision indicates an approval of the user based on at least one of a determination that second key is usable to decrypt the client authentication data or a determination that the second authentication identifier matches the first authentication identifier.

Clause 16. The authentication system of any of clauses 14 to 15, wherein the one or more processors are further configured to:

decrypt the client authentication data using the second key to obtain the first authentication identifier; and compare the second authentication identifier to the first authentication identifier, wherein the authentication decision indicates an approval of the user based on a determination that the second authentication identifier matches the first authentication identifier.

Clause 17. The authentication system of any of clauses 14 to 16, wherein the authentication decision indicates a denial of the user based on a determination that second key is not usable to decrypt the client authentication data.

Clause 18. The authentication system of any of clauses 14 to 17, wherein the authentication decision indicates a denial of the user based on a determination that the second authentication identifier does not match the first authentication identifier.

Clause 19. The authentication system of any of clauses 14 to 18, wherein the first key is assigned an expiration period, wherein the authentication decision indicates a denial of the user based on a determination that the expiration period is expired.

Clause 20. The authentication system of any of clauses 14 to 19, wherein the first credential is a quickcode, and wherein the second credential is a quickpin.

Clause 21. A method for performing an anonymous client registration process comprising any combination of steps described herein and/or shown in the Figures.

Clause 22. A method for performing an anonymous client activation process comprising any combination of steps described herein and/or shown in the Figures.

Clause 23. A method for performing an anonymous user ID and passcode initialization process comprising any combination of steps described herein and/or shown in the Figures.

Clause 24. A method for performing an anonymous user ID and passcode authentication process comprising any combination of steps described herein and/or shown in the Figures.

Clause 25. An authentication system comprising any feature, system, or component described herein and/or shown in the Figures.

Clause 26. The method of any of the previous clauses, wherein the session data includes one or any combination of: anonymous_profile_id, account_id, payload_key, payload_nonce, payload_encrypted, client_id, account_id, and session_timestamp.

Terminology

The inventive concept now will be described more fully hereinafter with reference to the accompanying drawings, in which illustrative embodiments of the inventive concept are shown. This inventive concept may, however, be embodied in many different forms and should not be construed as limited to the embodiments set forth herein; rather, these embodiments are provided so that this disclosure will be thorough and complete, and will fully convey the scope of the inventive concept to those skilled in the art. Like numbers refer to like elements throughout. As used herein, the term "and/or" includes any and all combinations of one or more of the associated listed items.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and this specification and will not be interpreted in an idealized or overly formal sense unless expressly so defined herein.

As will be appreciated by one of skill in the art, the inventive concept may be embodied as a method, data processing system, or computer program product. Accordingly, the present inventive concept may take the form of an entirely hardware embodiment or an embodiment combining software and hardware aspects all generally referred to herein as a "circuit" or "module." Furthermore, the present inventive concept may take the form of a computer program product on a computer-usable storage medium having computer-usable program code embodied in the medium. Any suitable computer readable medium may be utilized including hard disks, CD-ROMs, optical storage devices, a transmission media such as those supporting the Internet or an intranet, or magnetic storage devices.

Computer program code for carrying out operations of the present inventive concept may be written in an object-oriented programming language such as Java®, PHP, Dart or C++. However, the computer program code for carrying out operations of the present inventive concept may also be written in conventional procedural programming languages, such as the "C" programming language or in a visually oriented programming environment, such as Visual Basic or JavaFx.

The program code may execute entirely on the user's computer, partly on the user's computer, as a stand-alone software package, partly on the user's computer and partly on a remote computer or entirely on the remote computer. In the latter scenario, the remote computer may be connected to the user's computer through a local area network (LAN) or a wide area network (WAN), or the connection may be made to an external computer (for example, through the Internet using an Internet Service Provider).

The inventive concept is described in part below with reference to a flowchart illustration and/or block diagrams of methods, systems and computer program products according to embodiments of the inventive concept. It will be understood that each block of the illustrations, and combinations of blocks, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the block or blocks.

These computer program instructions may also be stored in a computer-readable memory that can direct a computer or other programmable data processing apparatus to function in a particular manner, such that the instructions stored in the computer-readable memory produce an article of manufacture including instruction means which implement the function/act specified in the block or blocks.

The computer program instructions may also be loaded onto a computer or other programmable data processing apparatus to cause a series of operational steps to be performed on the computer or other programmable apparatus to produce a computer implemented process such that the instructions which execute on the computer or other programmable apparatus provide steps for implementing the functions/acts specified in the block or blocks.

For the purposes of this specification and appended claims, unless otherwise indicated, all numbers expressing amounts, sizes, dimensions, proportions, shapes, formulations, parameters, percentages, quantities, characteristics, and other numerical values used in the specification and claims, are to be understood as being modified in all instances by the term "about" even though the term "about" may not expressly appear with the value, amount or range. Accordingly, unless indicated to the contrary, the numerical parameters set forth in the following specification and attached claims are not and need not be exact, but may be approximate and/or larger or smaller as desired, reflecting tolerances, conversion factors, rounding off, measurement error and the like, and other factors known to those of skill in the art depending on the desired properties sought to be obtained by the subject matter of the present inventive concept. For example, the term "about," when referring to a value can be meant to encompass variations of, in some embodiments±100%, in some embodiments±50%, in some embodiments±20%, in some embodiments±10%, in some embodiments±5%, in some embodiments #1%, in some embodiments±0.5%, and in some embodiments±0.1% from the specified amount, as such variations are appropriate to perform the disclosed methods or employ the disclosed compositions.

Further, the term "about" when used in connection with one or more numbers or numerical ranges, should be understood to refer to all such numbers, including all numbers in a range and modifies that range by extending the boundaries above and below the numerical values set forth. The recitation of numerical ranges by endpoints includes all numbers, e.g., whole integers, including fractions thereof, subsumed within that range (for example, the recitation of 1 to 5 includes 1, 2, 3, 4, and 5, as well as fractions thereof, e.g., 1.5, 2.25, 3.75, 4.1, and the like) and any range within that range.

In the specification, there have been disclosed embodiments of the inventive concept and, although specific terms are used, they are used in a generic and descriptive sense only and not for purposes of limitation. The following claim is provided to ensure that the present application meets all statutory requirements as a priority application in all jurisdictions and shall be construed as setting forth the scope of the present inventive concept.

What is claimed is:

1. A method performed by an authentication system for authenticating a computing device, the method comprising:
   receiving a request for a first credential from a computing device, wherein the request comprises a second credential generated by the computing device and encrypted session data, wherein the encrypted session data corresponds to a prior authentication of the computing device by the authentication system;
   decrypting the encrypted session data to obtain decrypted session data;
   determining a user identifier based on the decrypted session data;
   generating the first credential;
   generating a first authentication identifier based on the first credential, the second credential, and a cryptographically secure hash function;
   generating a first key based on the first credential and the second credential;
   encrypting client authentication data using the first key as a key to create encrypted client authentication data, wherein the client authentication data comprises the first authentication identifier;
   communicating the first credential to the computing device, wherein the computing device uses the first credential and the second credential to log in to a third-party entity system;
   receiving, from the third-party entity system, a request to authenticate a user, wherein the request to authenticate the user includes a set of credentials provided by the user as part of a login procedure for an application associated with the third-party entity system;
   generating a second authentication identifier based on the set of credentials and the cryptographically secure hash function;

creating a second key based on the set of credentials; and
communicating an authentication decision to the third-party entity system based at least in part on the second authentication identifier and the second key.

2. The method of claim 1, wherein the authentication decision indicates an approval of the user based on at least one of a determination that second key is usable to decrypt the client authentication data or a determination that the second authentication identifier matches the first authentication identifier.

3. The method of claim 1, further comprises:
decrypting the client authentication data using the second key to obtain the first authentication identifier; and
comparing the second authentication identifier to the first authentication identifier,
wherein the authentication decision indicates an approval of the user based on a determination that the second authentication identifier matches the first authentication identifier.

4. The method of claim 1, wherein the authentication decision indicates a denial of the user based on a determination that second key is not usable to decrypt the client authentication data.

5. The method of claim 1, wherein the authentication decision indicates a denial of the user based on a determination that the second authentication identifier does not match the first authentication identifier.

6. The method of claim 1, wherein the first key is assigned an expiration period, wherein the authentication decision indicates a denial of the user based on a determination that the expiration period is expired.

7. The method of claim 1, wherein the first credential is a quickcode, and wherein the second credential is a quickpin.

8. The method of claim 1, wherein the request to authenticate the user further comprises an API key, wherein the API key is a unique, private key previously assigned to the third-party entity system by the authentication system.

9. The method of claim 1, wherein the second credential is a hashed version of a third credential, wherein the third credential is generated by the computing device accordingly to a generation policy.

10. The method of claim 1, wherein said generating the first authentication identifier comprises:
hashing the first credential to create a hashed first credential; and
hashing the hashed first credential and the second credential to create the first authentication identifier.

11. The method of claim 1, further comprising creating an authentication object key salt, wherein generating the first key is based on the authentication object key salt.

12. The method of claim 1, wherein the session data includes at least one of a profile identifier or an account identifier.

13. An authentication system comprising
memory; and
one or more processors coupled to the memory and configured to:
receive a request for a first credential from a computing device, wherein the request comprises a second credential generated by the computing device and encrypted session data, wherein the encrypted session data corresponds to a prior authentication of the computing device by the authentication system;
decrypt the encrypted session data to identify an account user;
generate the first credential;
generate a first authentication identifier based on the first credential, the second credential, and a cryptographically secure hash function;
generate a first key based on the first credential and the second credential;
encrypt client authentication data using the first key as a key to create encrypted client authentication data, wherein the client authentication data comprises the first authentication identifier;
communicate the first credential to the computing device, wherein the computing device uses the first credential and the second credential to log in to a third-party entity system;
receive, from the third-party entity system, a request to authenticate a user, wherein the request to authenticate the user includes a set of credentials provided by the user as part of a login procedure for an application associated with the third-party entity system;
generate a second authentication identifier based on the set of credentials and the cryptographically secure hash function;
create a second key based on the set of credentials; and
communicate an authentication decision to the third-party entity system based at least in part on the second authentication identifier and the second key.

14. The authentication system of claim 13, wherein the authentication decision indicates an approval of the user based on at least one of a determination that second key is usable to decrypt the client authentication data or a determination that the second authentication identifier matches the first authentication identifier.

15. The authentication system of claim 13, wherein the one or more processors are further configured to:
decrypt the client authentication data using the second key to obtain the first authentication identifier; and
compare the second authentication identifier to the first authentication identifier,
wherein the authentication decision indicates an approval of the user based on a determination that the second authentication identifier matches the first authentication identifier.

16. The authentication system of claim 13, wherein the authentication decision indicates a denial of the user based on a determination that second key is not usable to decrypt the client authentication data.

17. The authentication system of claim 13, wherein the authentication decision indicates a denial of the user based on a determination that the second authentication identifier does not match the first authentication identifier.

18. The authentication system of claim 13, wherein the first key is assigned an expiration period, wherein the authentication decision indicates a denial of the user based on a determination that the expiration period is expired.

* * * * *